(12) United States Patent
Hao et al.

(10) Patent No.: US 9,118,884 B2
(45) Date of Patent: Aug. 25, 2015

(54) METHODS, SYSTEMS AND COMPUTER PROGRAM PRODUCTS FOR LOCAL DVR SCHEDULING CONFLICT MANAGEMENT

(75) Inventors: Jack Jianxiu Hao, Lexington, MA (US); Fenglin Yin, Lexington, MA (US); Zhiying Jin, Lexington, MA (US); Wenjie Liu, Waltham, MA (US); Juhong Liu, Sudbury, MA (US); Andrew Roberto Turner, Belmont, MA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 841 days.

(21) Appl. No.: 12/339,008

(22) Filed: Dec. 18, 2008

(65) Prior Publication Data

US 2010/0158476 A1 Jun. 24, 2010

(51) Int. Cl.
| | |
|---|---|
| *H04N 5/76* | (2006.01) |
| *H04N 5/782* | (2006.01) |
| *H04N 21/4147* | (2011.01) |
| *H04N 21/433* | (2011.01) |
| *H04N 21/45* | (2011.01) |
| *H04N 21/458* | (2011.01) |
| *H04N 21/472* | (2011.01) |

(52) U.S. Cl.
CPC ........... *H04N 5/782* (2013.01); *H04N 21/4147* (2013.01); *H04N 21/4334* (2013.01); *H04N 21/4532* (2013.01); *H04N 21/4583* (2013.01); *H04N 21/47214* (2013.01)

(58) Field of Classification Search
USPC ............ 725/58; 386/223, 234, 292, 284, 291, 386/293
See application file for complete search history.

(56) References Cited

U.S. PATENT DOCUMENTS

| | | | |
|---|---|---|---|
| 6,344,878 B1 * | 2/2002 | Emura | 348/460 |
| 7,743,398 B2 * | 6/2010 | DeYonker et al. | 725/58 |
| 8,176,516 B2 * | 5/2012 | Krakirian et al. | 725/45 |
| 2008/0063381 A1 * | 3/2008 | Conroy et al. | 386/124 |
| 2008/0196065 A1 * | 8/2008 | Cheng et al. | 725/58 |
| 2009/0220208 A1 * | 9/2009 | Gustafson et al. | 386/83 |
| 2012/0301116 A1 * | 11/2012 | Ellis | 386/292 |

* cited by examiner

*Primary Examiner* — Thai Tran
*Assistant Examiner* — Mishawn Dunn

(57) ABSTRACT

This disclosure details the implementation of methods, systems and computer program products for local DVR scheduling conflict management (hereinafter, "SCM"). SCM systems allow for automatic organization, prioritization, and conflict resolution for multiple scheduled recording specifications. Conflicting scheduled recordings may be re-organized based on single-stage and/or multi-stage conflict resolution procedures. Embodiments of SCM systems may also implement weighted conflict resolution, wherein user preferences and/or prioritizations may be assigned to scheduled recordings and considered in the re-organization of conflicting recordings. In one embodiment, a method is disclosed, comprising: receiving a new scheduled recording instruction comprising at least a new program identifier and a new time; comparing the new scheduled recording instruction to an existing recording schedule to determine if a recording conflict exists; performing a conflict resolution for an existing conflict to yield a new recording schedule; and storing the new recording schedule in a scheduling database.

19 Claims, 13 Drawing Sheets

METHODS, SYSTEMS AND COMPUTER PROGRAM PRODUCTS FOR LOCAL DVR SCHEDULING CONFLICT MANAGEMENT

BACKGROUND

Scheduled recording systems have come about, allowing users to specify a future time at which a recording device is to begin recording a specified program. For example, video cassette recorders (VCRs) may be equipped with scheduling capabilities such that a user may insert a blank cassette and program the VCR to begin recording to the cassette from a specified channel at a specified future time. More recently, digital video recording (DVR) devices have come about that facilitate recording of digital media content directly to a digital storage device, such as a hard drive or a remote server for later retrieval and/or viewing.

The leading number of each reference number within the drawings indicates the figure in which that reference number is introduced and/or detailed. As such, a detailed discussion of reference number 101 would be found and/or introduced in FIG. 1. Reference number 201 is introduced in FIG. 2, etc.

DETAILED DESCRIPTION OF PREFERRED EMBODIMENTS

This disclosure details the implementation of methods, systems and computer program products for local DVR scheduling conflict management (hereinafter, "SCM"). SCM systems allow for automatic organization, prioritization, and conflict resolution for multiple scheduled recording specifications. Conflicting scheduled recordings may be re-organized based on single-stage and/or multi-stage conflict resolution procedures. Embodiments of SCM systems may also implemented weighted conflict resolution, wherein user preferences and/or prioritizations may be assigned to scheduled recordings and considered in the re-organization of conflicting recordings.

In one embodiment, a method is disclosed, comprising: receiving a new scheduled recording instruction comprising at least a new program identifier and a new time; comparing the new scheduled recording instruction to an existing recording schedule to determine if a recording conflict exists; performing a conflict resolution for an existing conflict to yield a new recording schedule; and storing the new recording schedule in a scheduling database.

It is to be understood that, depending on the particular needs and/or characteristics of an SCM user, administrator, DVR and/or mobile device system, media server, wireless server, data payload, monetization model, hardware configuration, network framework, and/or the like, various embodiments of the SCM may be implemented that enable a great deal of flexibility and customization. The instant disclosure discusses embodiments of the SCM primarily within the context of scheduled recordings of digital video. However, it is to be understood that the system described herein may be readily configured/customized for a wide range of other applications or implementations. For example, aspects of SCM systems may be adapted for radio and/or other audio recordings, scheduled recording of internet events, and/or the like applications. It is to be understood that the SCM may be further adapted to other implementations and/or scheduling applications.

Figure 1:
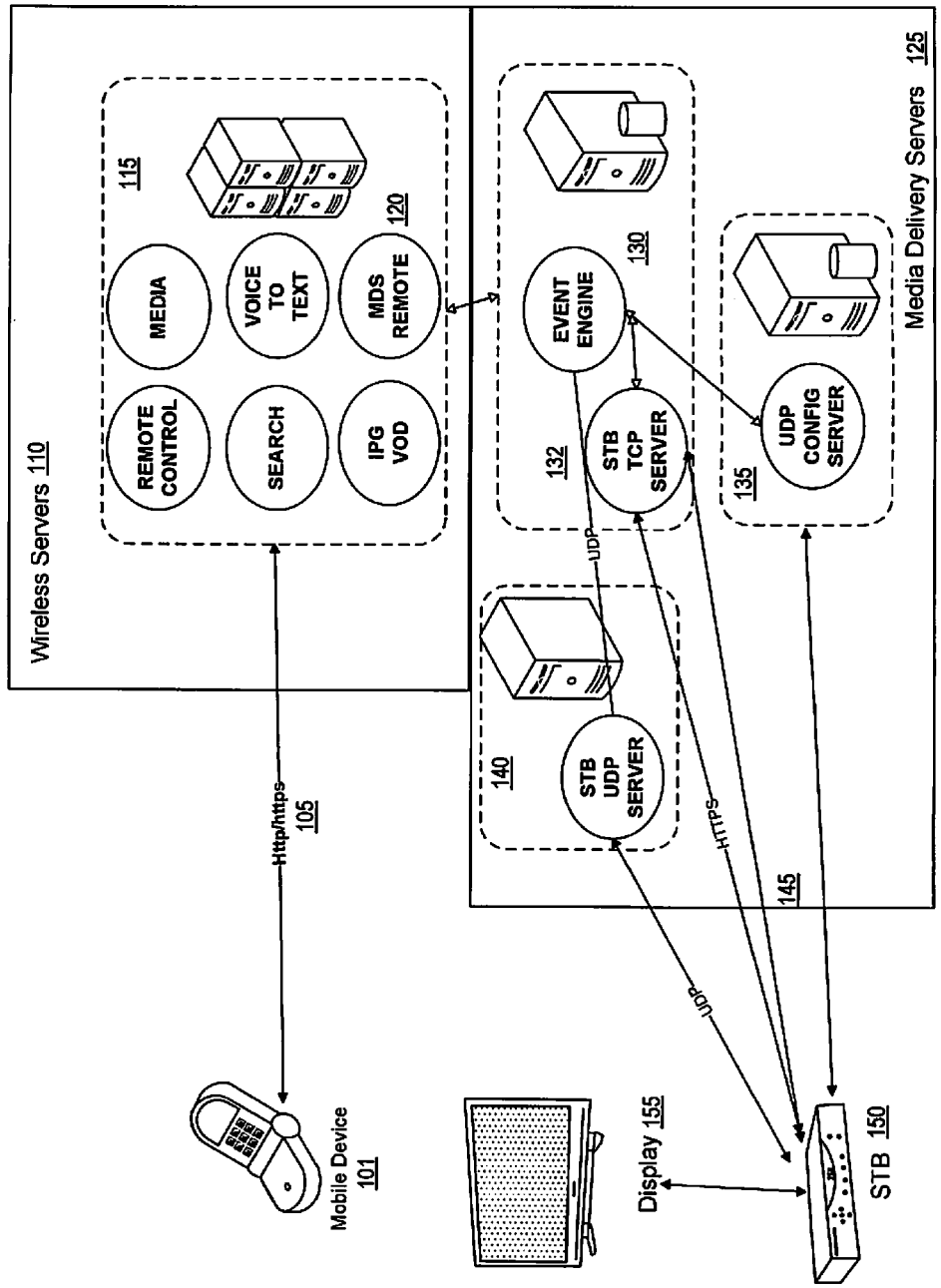
FIG. 1 shows an implementation of data flow among and between system components and affiliated entities in one embodiment of scheduling conflict management ("SCM") operation.

FIG. 1 shows an implementation of data flow among and between system components and affiliated entities in one embodiment of SCM operation. In one embodiment, a mobile device 101 may be connected to wireless servers 110 via a communications network implementing any of a variety of communications protocols, such as but not limited to hypertext transfer protocols (http) 105. A display (e.g., a television) 155 and/or a local media receiver device (e.g., a set-top box (STB)) 150, on the other hand, may be coupled to one or more media delivery servers (MDSs) 125 via communications networks implementing any of a variety of different communications protocols, such as but not limited to http, user datagram protocol (UDP), and/or the like 145. In one implementation, media delivery servers may comprise Verizon Fiber Optic System (FiOS) servers. Via coupling between the wireless servers 110 and the media delivery servers 125, the mobile device 101 may ultimately connect to and/or communicate with the STB 150, display 155, and/or the like.

Wireless servers 110 may contain subsystems and/or functional modules 115 configured to implement a wide variety of functions, services and/or features associated with embodiments of SCM operation. In the illustrated implementation, these modules may include remote control services, an interactive program guide (IPG) and video-on-demand (VOD) services, media services, text-based search services, voice search services, MDS remote systems 120, and/or the like. In one implementation, a remote control service may be configured to control service interfaces with a DVR system and provide other functionality, such as but not limited to: management of scheduling to record television (TV) programs, viewing/deleting of recorded programs or in-progress recording, parental control management, channel favorites and VOD bookmarks, user authentication and user profile management, application provisioning, and/or the like. IPG and VOD services may be configured to provide functionality, such as but not limited to: browsing television program guides based on channel and time; filtering television programs based on high-definition (HD) channels, program ratings, program types, user favorites, profiles, and/or the like; and browsing VOD contents based on folder names, hierarchical position of folders, and/or the like. Media services may be configured to process images, preview video clips, logos, and/or the like associated with TV and VOD programs and/or channel content, as well as transcoding of videos for different mobile device platforms. Text based search services may provide character and key word based searching capability for users to search TV programs and VOD content texts. Voice search services may employ a speech recognition engine to translate audio commands into text and, in one implementation, prompt users to choose text for searching content. In one implementation, the speech recognition engine may use grammars built from TV program and VOD content texts.

An MDS remote system component 120 may serve as an intermediary liaison between wireless server 10 components and MDS 125 components. For example, messages 145 communicated between the MDS 125 and the STB 150 may, in one implementation, comprise encrypted binary data structures. An MDS remote system 120, then, may serve to translate those encrypted binary data structures into one or more formats and/or protocols suitable for delivery to wireless server 110 components and/or mobile devices 101 and may, in one implementation, present a Simple Object Access Protocol (SOAP) for communicating with the STB.

The MDS 125 may also include a variety of components and/or subsystems configured to implement various features, services, and/or functionality. An Event Engine 130 may receive all STB requests posted, for example, from wireless servers 110 and relay those requests to the STB through UDP or TCP servers, depending, for example, on the type of broadband home router. An STB TCP server 132 may be employed for configuring messages from the Event Engine 130 to the STB as TCP messages. Similarly, an STB UDP sever 140 may configure requests forwarded by the Event Engine 130 as UDP messages when UDP is supported by the broadband home router. The UDP server 140 may send requests to the STB using one or more STB network configurations by calling a UDP configuration server 135, which acts as a repository for STB UDP network configurations, including router wide area network (WAN) internet protocol (IP) address, port forwarding port, encryption key, and/or the like.

Figure 2:
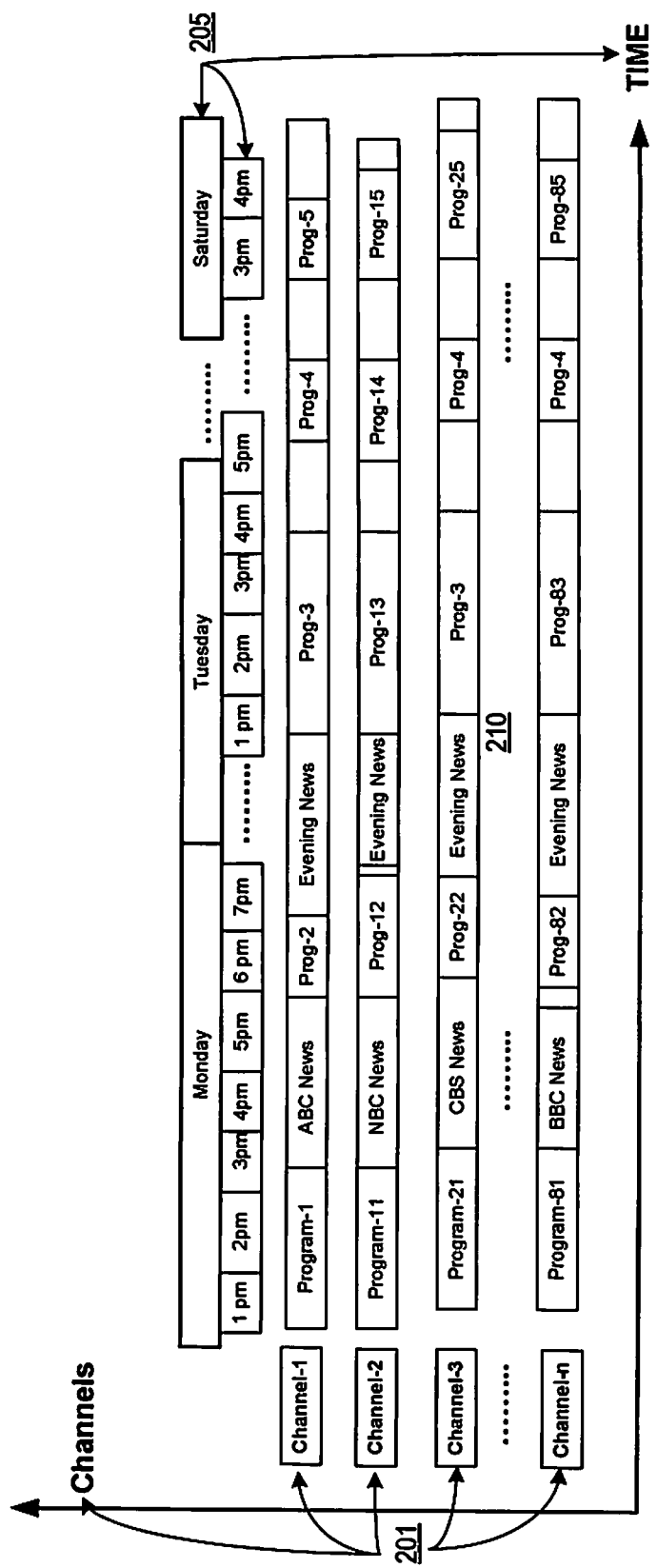
FIG. 2 shows an implementation of a programming schedule in one embodiment of SCM operation.

FIG. 2 shows an implementation of a programming schedule in one embodiment of SCM operation. In one implementation, a programming schedule may comprise a plurality of programs 210 organized by channel 201 and time 201. A program 210 may be characterized by the channel 201 on which the program is being broadcast and the time 205 at which the program begins. Programs may further be characterized by other program information in various implementations, such as a program name, program ID, program type, rating, run time, and/or the like.

Figure 3:
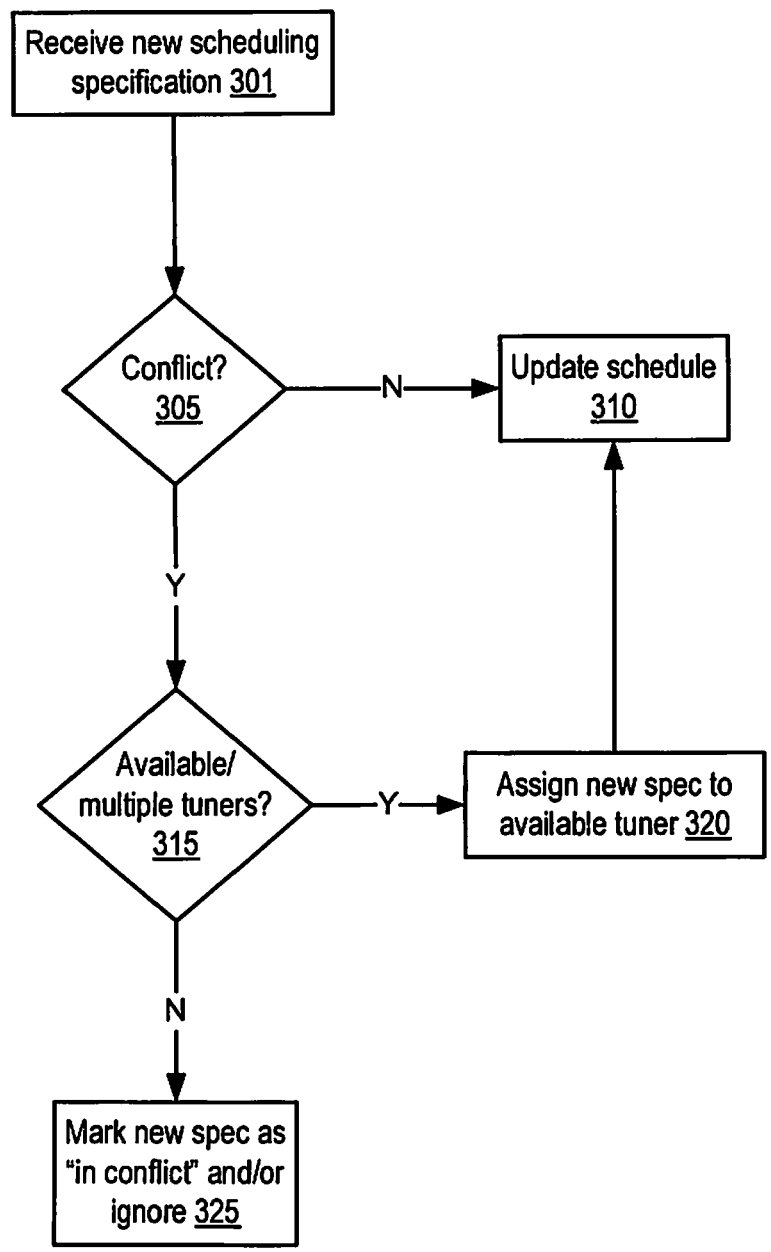
FIG. 3 shows an implementation of logic flow for first-come-first-served scheduling conflict resolution in one embodiment of SCM operation.

FIG. 3 shows an implementation of logic flow for first-come-first-served scheduling conflict resolution in one embodiment of SCM operation. A new scheduling specification may be received at 301. In various implementations, the new scheduling specification may be received from a user's mobile device, from a web interface, from direct input into an STB and/or television interface, and/or the like. The scheduling specification comprises information based on which the SCM system and/or associated DVR systems may schedule recording of one or more programs. In various implementations, recorded programs may comprise television programs, radio programs, events on the internet, and/or the like recordable events. In one implementation, a scheduling specification may comprise a program identifier, a time identifier, explicit or implicit recording authorization, a user and/or user device identifier, and/or the like. In one implementation, a scheduling specification may be received via a television interface (such as via a menu displayed on the television and associated with a digital media service, such as may be mediated via a local media receiver device, set top box, and/or the like). In another implementation, a scheduling specification may be provided via a mobile remote DVR application and/or via inputs on a mobile device. In still another implementation, a scheduling specification may be provided via a website comprising a scheduled recording web interface. A determination is made at 305 as to whether any conflict exists between the new scheduling specification and any existing scheduled specifications. If not, then the recording schedule may be updated with the new scheduling specification 310. Otherwise, a determination may be made as to whether there exist multiple tuners, by which an SCM system could implement or direct recording of different channels at the same time 315. If so, then the new scheduling specification may be assigned to an available tuner 320 and the recording schedule updated accordingly 310. Otherwise, the new scheduling specification may be marked as "In Conflict", may be ignored, an error message may be provided to the user, and/or the like 325.

Figure 4:
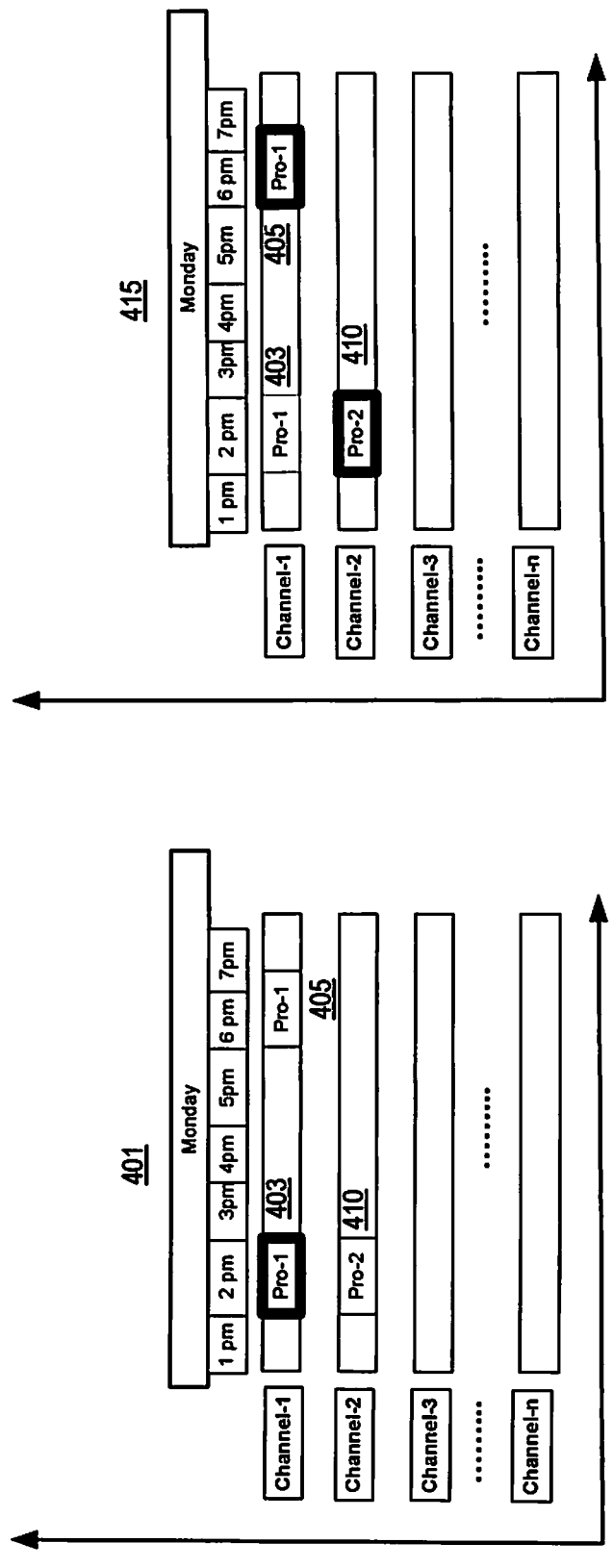
FIG. 4 shows an implementation of a programming schedule illustrating single-stage scheduling conflict resolution in one embodiment of SCM operation.

FIG. 4 shows an implementation of a programming schedule illustrating single-stage scheduling conflict resolution in one embodiment of SCM operation. In the programming/recording schedule shown at 401, there are two programs: Program 1 (403 and 405) and Program 2 (410). Program 1 has two show times, one at 2 PM on Monday 403, which has been designated for scheduled recording, and another at 6 PM on the same day 405. Program 2 is showing only at 2 PM on Monday 410. Should a user seek to designate Program 2 410 for scheduled recording, a conflict may arise with the already existing scheduled recording of Program 1 at 403. According to the implementation of FIG. 3, and assuming that only one tuner is available, Program 2 would be designated as "In Conflict" and the request to schedule it's recording may be ignored. However, a single-stage conflict resolution procedure, such as that shown in FIG. 5, may be undertaken to resolve the conflict and still record both programs. As shown in the program schedule at 415, the SCM system may remove the designation of scheduled recording for the 2 PM Program 1 at 403 and transfer it to the 6 PM Program 1 at 405, thus allowing the 2 PM Program 2 at 410 to also be designated for scheduled recording.

Figure 5:
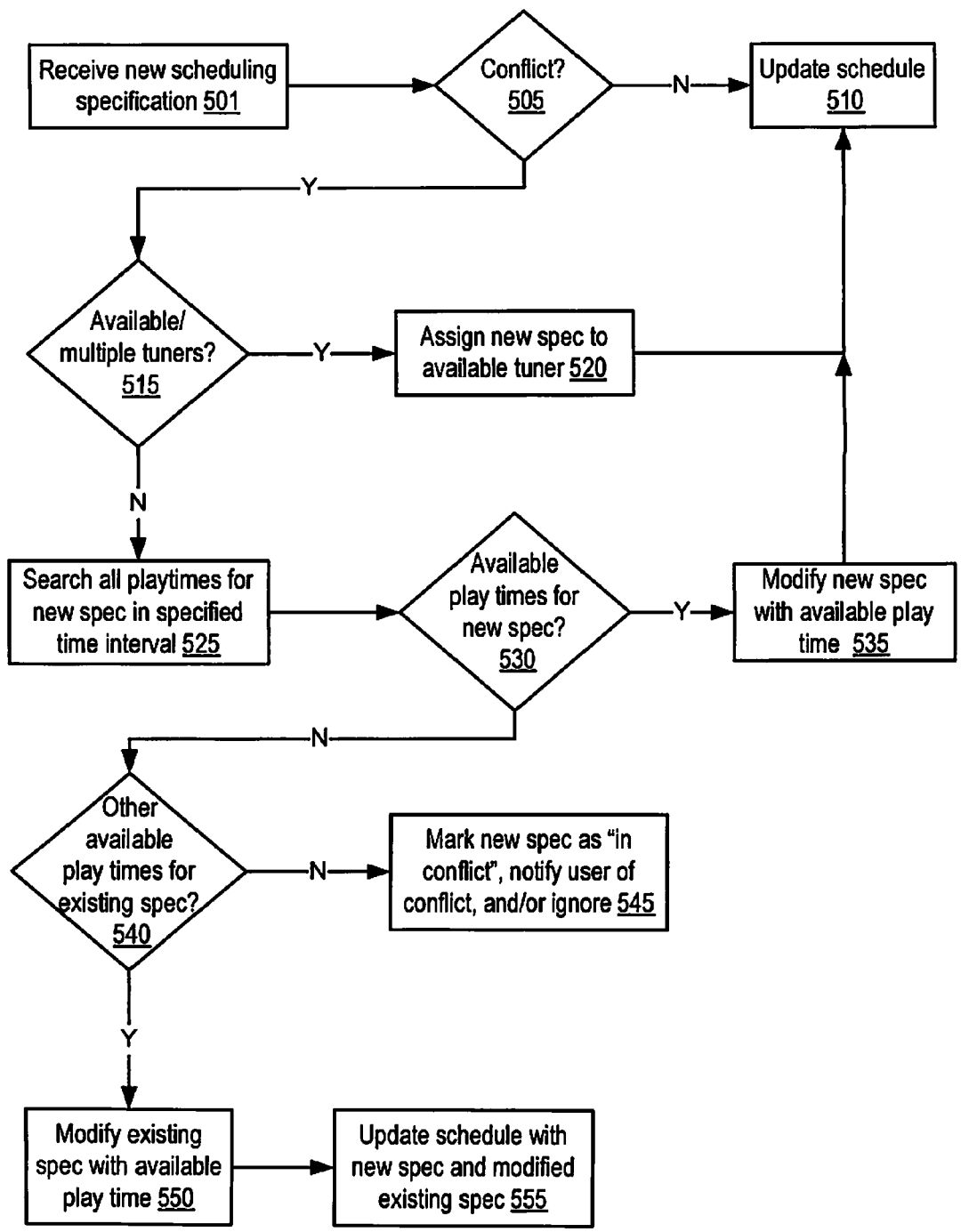
FIG. 5 shows an implementation of logic flow for single-stage scheduling conflict resolution in one embodiment of SCM operation.

FIG. 5 shows an implementation of logic flow for single-stage scheduling conflict resolution in one embodiment of SCM operation. A new scheduling specification may be received at 501. A determination is made at 505 as to whether any conflict exists between the new scheduling specification and any existing scheduled specifications. If not, then the recording schedule may be updated with the new scheduling specification 510. Otherwise, a determination may be made as to whether there exist multiple tuners, by which an SCM system could implement or direct recording of different channels at the same time 515. If so, then the new scheduling specification may be assigned to an available tuner 520 and the recording schedule updated accordingly 510. Otherwise, the SCM system may search the program schedule through a fixed period of time into the future (e.g., up to two weeks) to see if there is an additional play time for the program specified in the new specification 525. In one implementation, the SCM system may query and/or retrieve a program listing for each channel for the fixed period of time and search program names, identifiers, and/or the like to determine if the program exists. A determination is made at 530 as to whether an available play time exists for the new specification. A play time may be deemed available if the new play time does not conflict with the existing scheduled program recording, another scheduled program recording, and/or the like. If an available play time exists, the recording time in the new specification may be modified to reflect the available time 535, and the recording schedule may be updated accordingly 510. Otherwise, a determination may be made as to whether other available play times exist for the program already scheduled for recording (i.e., the program associated with an existing specification) 540. If not, then the new specification may be marked as "in conflict", ignored, an error message provided to the user, and/or the like 545. Otherwise, if an available play time exists for the first scheduled program, then the existing specification for that program may be modified to reflect the alternative available play time 550. The recording schedule may then be updated with the new specification, replacing the recording slot of the original existing specification, and the modified existing specification 555.

Figure 6:
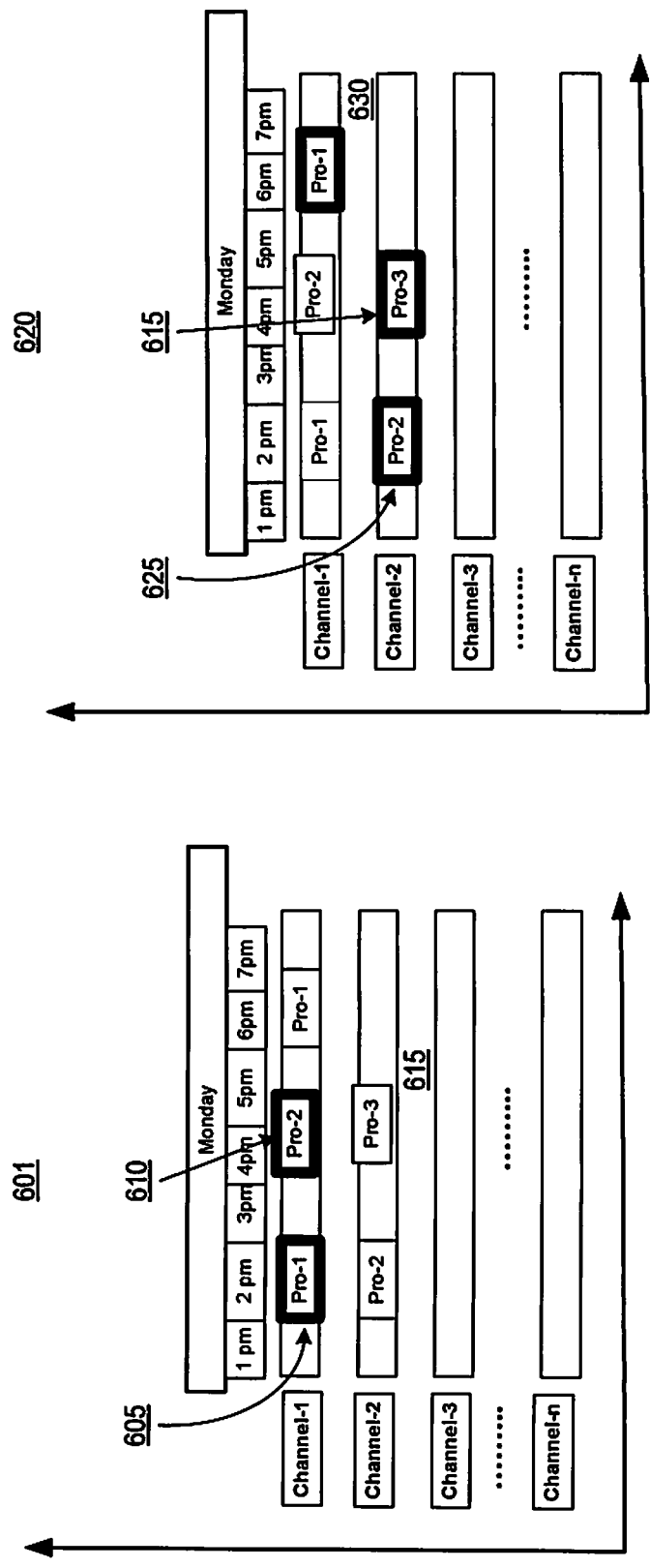
FIG. 6 shows an implementation of a programming schedule illustrating multi-stage scheduling conflict resolution in one embodiment of SCM operation.

FIG. 6 shows an implementation of a programming schedule illustrating multi-stage scheduling conflict resolution in one embodiment of SCM operation. In the program schedule at 601, Program 1 605 and Program 2 610 are shown as designated for recording. A user may then provide a new specification requesting that Program 3 615 be designated for recording as well. A single-stage conflict resolution procedure would appear to be unsuccessful in recording all three desired programs, since the only other showing of Program 2 625 is in conflict with Program 1 605. Here, a multi-stage conflict resolution may be implemented so that all three programs may be scheduled for recording on a single tuner. The SCM system may, for example, schedule Program 1 for a new recording time 630, schedule recording of Program 2 at 625 when Program 1 had been scheduled, and then schedule recording of Program 3 at 615 when Program 2 had been scheduled for recording.

Figure 7A:
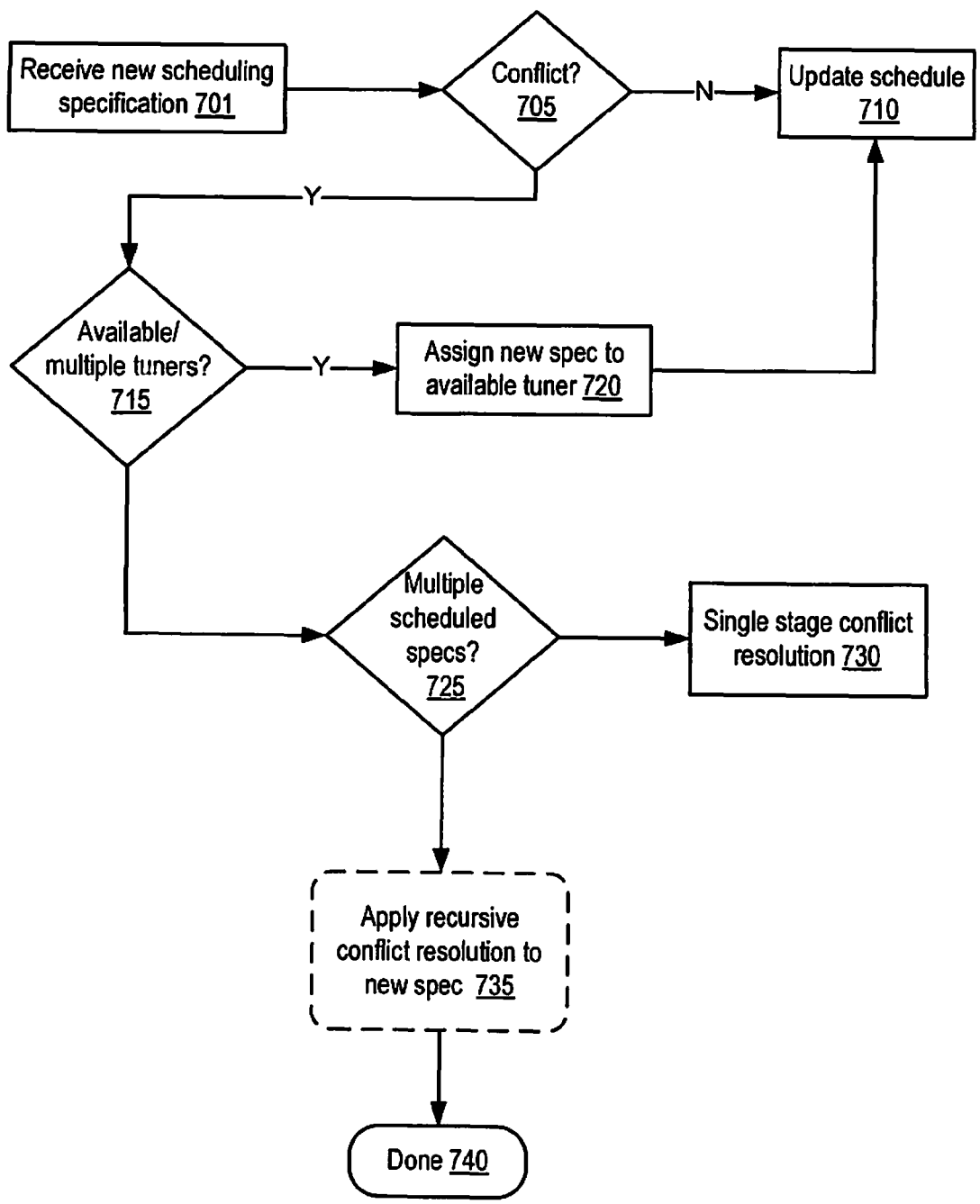
FIGS. 7A-7B show an implementation of logic flow for multi-stage scheduling conflict resolution in one embodiment of SCM operation.
Figure 7B:
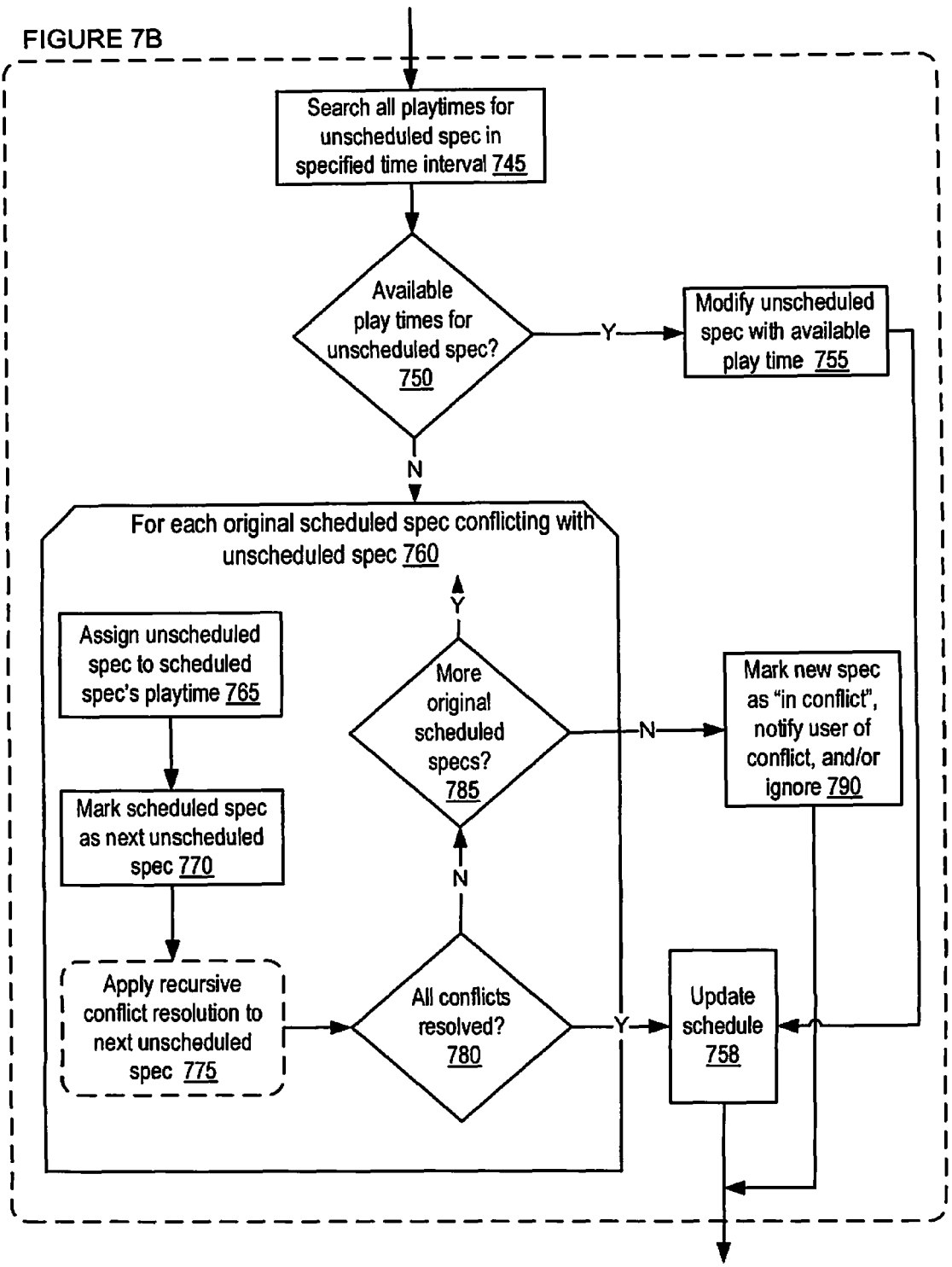

FIG. 7A-7B show an implementation of logic flow for multi-stage scheduling conflict resolution in one embodiment of SCM operation. In FIG. 7A, a new scheduling specification may be received at 701. A determination is made at 705 as to whether any conflict exists between the new scheduling specification and any existing scheduled specifications. If not, then the recording schedule may be updated with the new scheduling specification 710. Otherwise, a determination may be made as to whether there exist multiple tuners, by which an SCM system could implement or direct recording of different channels at the same time 715. If so, then the new scheduling specification may be assigned to an available tuner 720 and the recording schedule updated accordingly 710. Otherwise, a determination may be made as to whether there are multiple existing scheduled specifications (e.g., multiple scheduled programs for recording) 725. If not, then the SCM system may undertake single stage conflict resolution 730, such as that illustrated in one implementation in FIG. 5. If, however, multiple scheduled specifications exist at 725, the SCM system may apply a recursive conflict resolution, such as illustrated in greater detail in FIG. 7B, with the new specification taken as an input 735. Given the outcome of the recursive conflict resolution at 735, the multi-stage conflict resolution may be complete 740.

In FIG. 7B, the SCM system may search all playtimes for the program corresponding to the unscheduled specification over a specified time interval into the future (e.g., up to two weeks) 745. A determination may be made as to whether there exist available play times for the unscheduled specification 750 (e.g., play times that are not in conflict with any of the existing specifications, scheduled programs, and/or the like). If so, then the unscheduled specification is modified with the available play time 755, and the schedule is updated 758. Otherwise, for each originally scheduled specification, associated program, and/or the like that is in conflict with the unscheduled specification 760, the SCM system may assign the unscheduled specification to the time for the scheduled specification's play time 765. That scheduled specification may then be marked as unscheduled, and the SCM system may then apply the recursive conflict resolution procedure (e.g., that shown in FIG. 7B) with this newly unscheduled specification as input and disregarding the previously unscheduled specification which has now taken the play time of the newly unscheduled specification. A determination is made at 780 if all conflicts between recorded programs have been resolved 780. If so, then the schedule is updated 758. Otherwise, a determination is made as to whether there exist any more original existing scheduled specs to try 785. If so, the SCM system returns to 760 and cycles to the next existing scheduled specification. Otherwise, the SCM system may mark the new specification as "in conflict", notify the user of the conflict with an error message, ignore the request, and/or the like 790.

Figure 8:
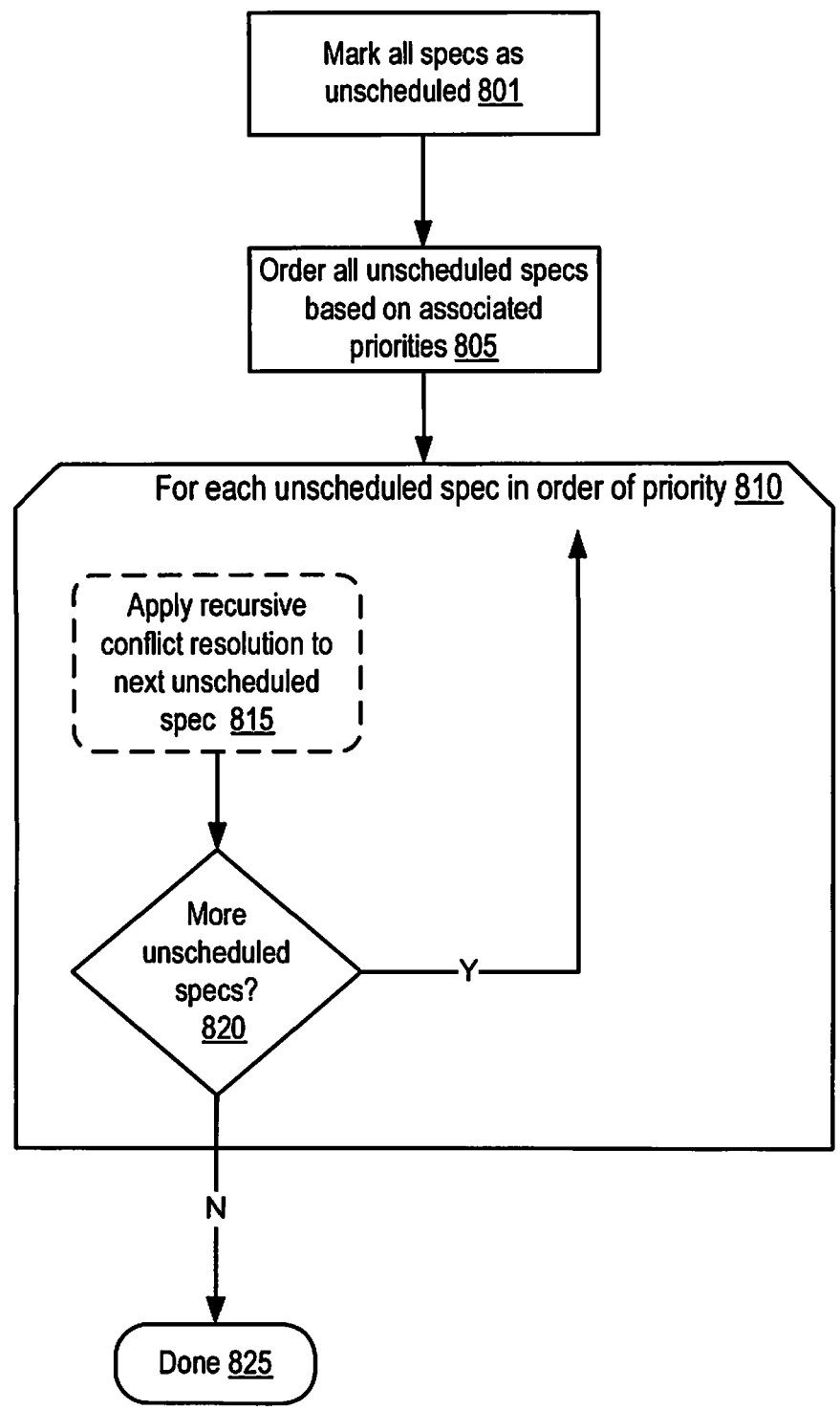
FIG. 8 shows an implementation of logic-flow for weighted multi-stage scheduling conflict resolution in one embodiment of SCM operation.

Multi-stage conflict resolution may also admit weighting and/or prioritization of scheduled recordings. FIG. 8 shows an implementation of logic-flow for weighted multi-stage scheduling conflict resolution in one embodiment of SCM operation. In one implementation, weighted multi-stage scheduling conflict resolution may be applied to a set of existing scheduled specifications while, in another implementation, weighted multi-stage scheduling conflict resolution may be invoked when a new specification is provided by a user. The SCM system may mark all existing and/or new specifications as unscheduled 801 and then order all unscheduled specifications based on their associated priorities 805. In one implementation, priorities may be specified and/or stored as numerical values, and priority-based ordering is performed based on numerical ordering. In one implementation, each priority assigned is unique to the program and/or specification to which it is assigned while, in another implementation, the same priority value and/or level may be applied to more than one program and/or scheduling specification. For each unscheduled specification in order or priority 810, the SCM system may then apply a recursive conflict resolution (e.g., such as that shown in FIG. 7B) to the next unscheduled specification in the list 815. A determination may then be made as to whether there are more unscheduled specifications 820. If so, then the SCM system returns to 810 and cycles to the next unscheduled specification in the list. Otherwise, the SCM system is finished with the weighted multi-stage scheduling conflict resolution 825.

In one implementation, program weights, priorities, and/or the like values may be obtained from a user, such as via a web interface, a mobile device, and/or the like. For example, when a user provides a new scheduled recording specification, he or she may be provided the option to further include a prioritization for recording the program associated therewith.

Figure 9A:
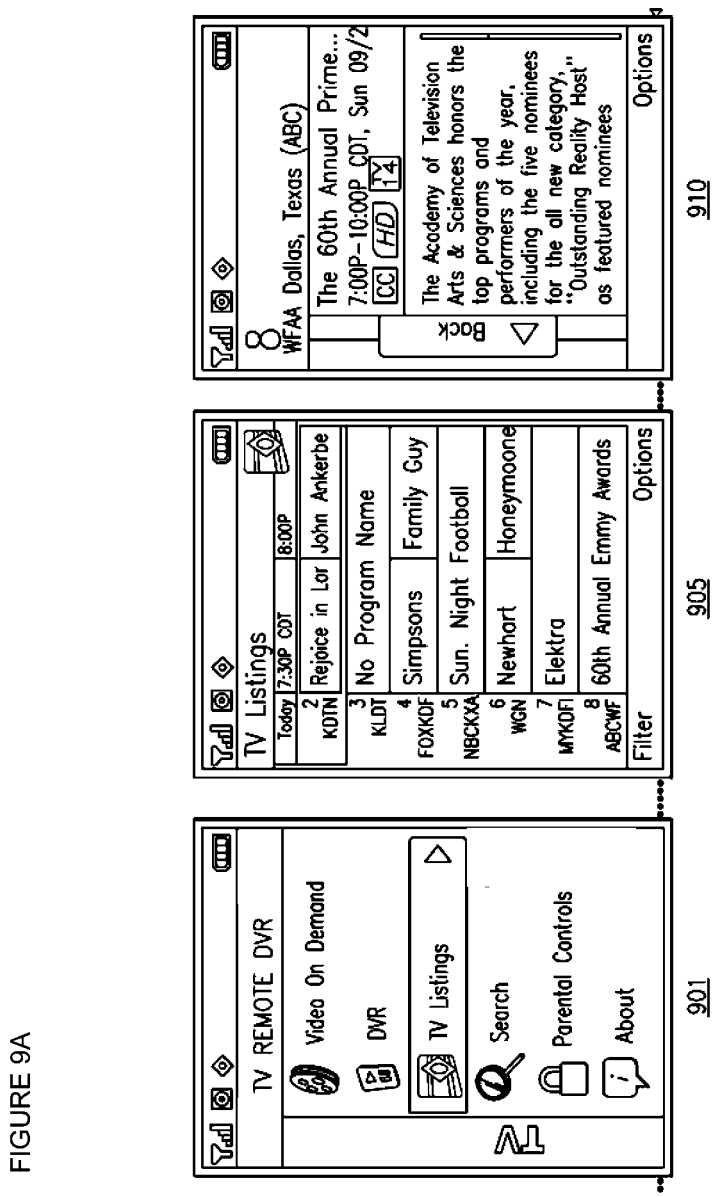
FIGS. 9A-9C show implementations of user interfaces for program inspection, scheduled recording, and recorded program management in one embodiment of SCM operation.
Figure 9B:
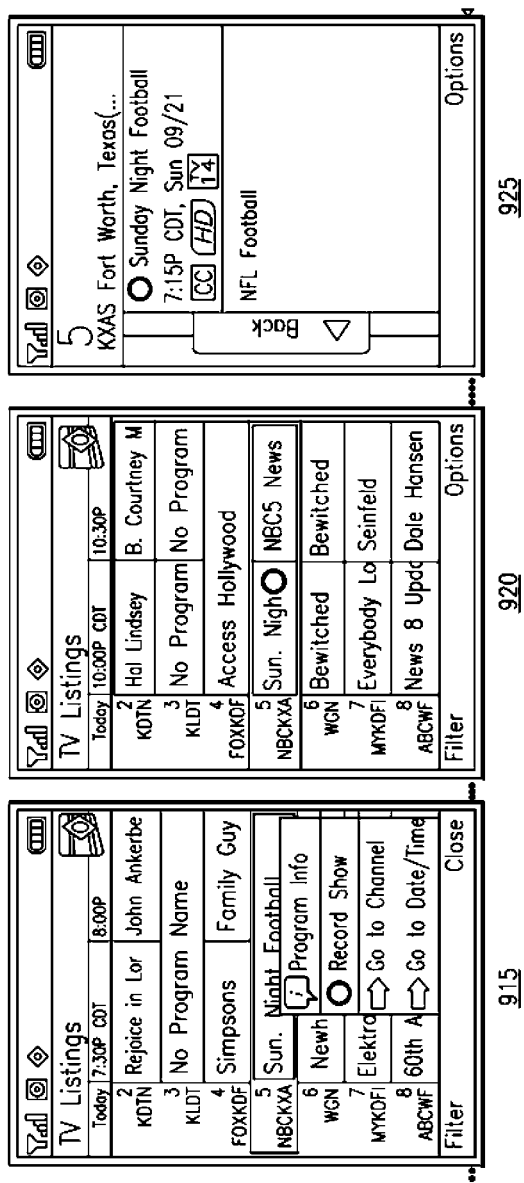
Figure 9C:
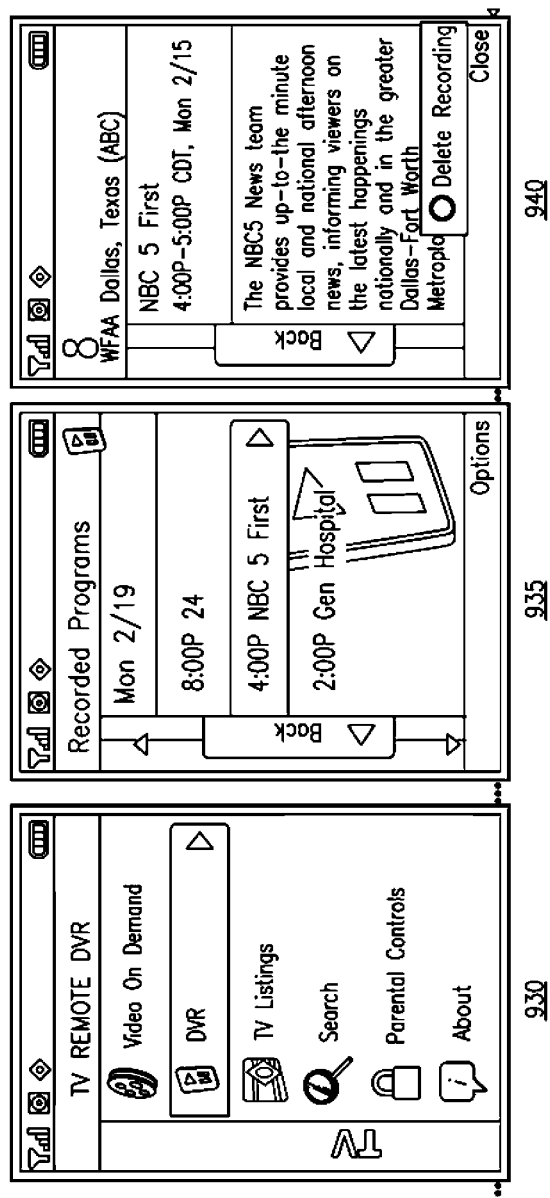

FIGS. 9A-9C show implementations of user interfaces for program inspection, scheduled recording, and recorded program management in one embodiment of SCM operation. A wide variety of interfaces are compatible with various embodiments and/or implementations of SCM operation. In one implementation, the interfaces shown in FIGS. 9A-9C may be displayed on a mobile remote DVR application, such as may run on a user's mobile device (e.g., a cellular telephone, blackberry, personal digital assistant, iPhone, and/or the like). The screen at 901 in FIG. 9A may be displayed upon launch of a program listing service and may provide a variety of menu items to access and/or control various components and/or features of the media service (e.g., Video on Demand, DVR, TV listings, search, parental controls, further information, and/or the like). Selection of the TV listings option may lead to the screen shown at 905, wherein a selection of program listings is shown for various channels over a particular period of time. Program listings may be queried from a database or third party programming server and supplied, for example, to a mobile remote DVR application via a communications network, hypertext transfer protocol, and/or the like. The interface at 905 may further permit the user to interact with the program listing by highlighting and/or selecting particular programs. For example, selection of the "60th Annual Emmy Awards" program may yield the screen shown at 910, wherein further information for that program is provided, including detailed play times, program details, descriptions, and/or the like. Selection of and/or interaction with a particular program in the interface screens shown at 905 and/or 910 (e.g., highlighting a program and clicking a particular button or sequence of buttons on the user's mobile device) may result in submission of a request for scheduled recording to the SCM system and/or associated DVR systems. The interface screens at 915-925 in FIG. 9B show aspects of program recording scheduling in one implementation. A program is selected and designated for recording at 915, and the scheduled recording status is thereafter indicated on the programming schedule 920 and on the detailed view of the program 925. A user may also be permitted to view and/or manage existing recordings comprising programs that have previously been recorded. In FIG. 9C, the user may select the DVR menu element at 930 to view all recorded programs 935. The user may then select any recorded program for a description of the program and may be provided the option to delete the recording 940.

In one implementation, an XML for signing in to mobile remote DVR services and acquiring a user profile may take a form similar to the following example:

```
<?xml version="1.0"?>
<brewPage>
    <opname>login</opname>
    <id>7814664235</id>
    <pac>3425</pac>
    <model>LGVX8500</model>
    <version>0.4.000</version>
</brewPage>
``` where inputs may include a login, an ID (e.g., a 10 digit mobile phone number), a PAC (e.g., the PAC associated with the user's STB), an STB model identifier (e.g., to assist in retrieving version and/or update information), an application version, and/or the like.

In one implementation, an XML for an SCM system response for the sign-in request shown above may take a form similar to the following example:

```
<?xml version="1.0" encoding="utf-8" ?>
<brewPage>
    <profile status="Activated" regionId="91121" vn="0.1"
        update="False" vhoId="VHOGTW" timeOffset="360" />
</brewPage>
``` where a status may reflect the status of activating a mobile device to manage the STB and/or implement mobile remote DVR functionality, a regionID may indicate a region associated with video service, a vhoID may correspond to a video headend office, vn may reflect an on-deck version number of the application, an update may reflect the status of mandatory updates, a timeoffset may indicate the standard time offset relative to coordinated universal time, and/or the like.

In one implementation, an XML for requesting schedule viewing may take a form similar to the following example:

```
<?xml version="1.0"?>
<brewPage>
    <opname>getDvrSchedule</opname>
    <stbId>1087720755</stbId>
    <regionId>91121</regionId>
    <id>7814664235</id>
    <pac>3425</pac>
</brewPage>
```

In one implementation, an XML for responding to a request for schedule viewing may take a form similar to the following example:

```
<?xml version="1.0" encoding="utf-8" ?>
<brewPage>
    <prg stn="504" ch="5" chcs="" chnam="NBC KXAS"
    fios="4129348716" nam="NBC5 News at 6:00"
    str="20071023180000" end="20071023183000"
    serie="0" pvr="3356" desc="Local evening news."
    flag="0" />
</brewPage>
```

In one implementation, an XML for setting recording schedules may take a form similar to the following example:

```
<?xml version="1.0"?>
<brewPage>
    <opname>setDvrSchedule</opname>
    <stbId>1087720755</stbId>
    <regionId>91121</regionId>
    <fiosId>3226863535</fiosId>
    <stationId>504</stationId>
    <date>02192007</date>
    <time>160030</time>
    <duration>60</duration>
    <id>7814664235</id>
    <pac>3425</pac>
</brewPage>
```

In one implementation, an XML for responding to a request to set recording schedules may take a form similar to the following example:

```
<brewPage>
    <result code="0" msg="success" />
</brewPage>
```

Here, 0 indicates a successful scheduling. In the event of unsuccessful scheduling, various error messages may be returned. For example, an error message may be returned if a user attempts to record an HD program without having the requisite HD tuner and/or compatible STB, if an unresolvable scheduling conflict exists, if the channel for the requested program is not available on a channel map, and/or the like.

In one implementation, an XML for deleting recording schedules may take a form similar to the following example:

```
<?xml version="1.0"?>
<brewPage>
    <opname>deleteDvrSchedule</opname>
```

-continued

```
    <stbId>1087720755</stbId>
    <regionId>91121</regionId>
    <record>607,02192007,110030</record>
    <record>607,02192007,140030</record>
    <record>607,02192007,180000</record>
    <record>607,02192007,220000</record>
    <id>7814664235</id>
    <pac>3425</pac>
</brewPage>
```

In one implementation, an XML for responding to a request to delete recording schedules may take a form similar to the following example:

```
<?xml version="1.0" encoding="utf-8" ?>
<brewPage>
    <result code="0" msg="success" />
    <result code="0" msg="success" />
    <result code="0" msg="success" />
    <result code="1" msg="fail" />
</brewPage>
```

Here, again, a 0 indicates a successful deletion, and other result codes indicate a failure.

In one implementation, an XML for setting series recording schedules may take a form similar to the following example:

```
<?xml version="1.0"?>
<brewPage>
    <opname>setDvrSchedule</opname>
    <stbId>1087720755</stbId>
    <regionId>91121</regionId>
    <seriesd>3226863535</seriesId>
    <seriesName>Friends</seriesName>
    <stationId>504</stationId>
    <date>02192007</date>
    <time>160030</time>
    <duration>60</duration>
    <id>7814664235</id>
    <pac>3425</pac>
</brewPage>
```

In one implementation, an XML for responding to a request to set series recording schedules may take a form similar to the following example:

```
<brewPage>
    <result code="0" msg="success" />
</brewPage>
```

In one implementation, an XML for deleting series recording schedules may take a form similar to the following example:

```
<?xml version="1.0"?>
<brewPage>
    <opname>deleteDvrSchedule</opname>
    <stbId>1087720755</stbId>
    <regionId>91121</regionId>
    <seriesId>607,02192007,110030</seriesId>
    <id>7814664235</id>
    <pac>3425</pac>
</brewPage>
```

In one implementation, an XML for responding to a request to delete series recording schedules may take a form similar to the following example:

```
<?xml version="1.0" encoding="utf-8" ?>
<brewPage>
    <result code="0" msg="success" />
</brewPage>
```

In one implementation, an XML for viewing recorded programs may take a form similar to the following example:

```
<?xml version="1.0"?>
<brewPage>
    <opname>getDvrRecording</opname>
    <stbId>1087720755</stbId>
    <regionId>91121</regionId>
    <id>7814664235</id>
    <pac>3425</pac>
</brewPage>
```

In one implementation, an XML for responding to a request to view recorded programs may take a form similar to the following example:

```
<?xml version="1.0" encoding="utf-8"?>
<brewPage>
    <prg stn="409" ch="2" chcs="" chnam="CBS WCBS" fios=
    "1611603710" nam="Late Show with David Letterman" str=
    "20080923233430" end="20080924003730" serie=
    "0" pvr="559451588" desc="" flag="0" />
    <prg stn="242" ch="5" chcs="" chnam="FOX WNYW" fios=
    "2693909591" nam="House" str="20080923200031" end=
    "20080923205959" serie="0" pvr="0"desc="" flag="0" />
    <prg stn="409" ch="2" chcs="" chnam="CBS WCBS" fios=
    "2201991470" nam="NCIS" str="20080923200000" end=
    "20080923210000" serie="0" pvr="0" desc="" flag="0" />
</brewPage>
```

Here, 0 indicates a normal status, 1 indicates that recording is in progress, and 2 indicates that the program has a protected status.

In one implementation, an XML for deleting recorded programs may take a form similar to the following example:

```
<?xml version="1.0"?>
<brewPage>
    <opname>deleteDvrRecording</opname>
    <stbId>1087720755</stbId>
    <regionId>91121</regionId>
    <record>504,02132007,172000</record>
    <record>607,02192007,140000</record>
    <record>607,02192007,180000</record>
    <record>607,02192007,180000</record>
    <record>607,02192007,220000</record>
    <id>7814664235</id>
    <pac>3425</pac>
</brewPage>
```

In one implementation, an XML for responding to a request to delete recorded programs may take a form similar to the following example:

```
<?xml version="1.0" encoding="utf-8" ?>
<brewPage>
    <result code="0" msg="success" />
    <result code="0" msg="success" />
    <result code="0" msg="success" />
    <result code="1" msg="fail" />
</brewPage>
```

In one implementation, a request for viewing a program schedule may take a form similar to the following example:

```
http://<ip>:<port>/xml/schedule?regionId=91412&dateTime=
20080924150000&duration=720&startChannel=1&channelCount=50
```

In one implementation, an XML for responding to a request to view a program schedule may take a form similar to the following example:

```
<?xml version="1.0" encoding="utf-8" ?>
<result_page>
    <meta startChannel="1" start="200809241500" channelCount="50"
    maxChannel="1951" endChannel="70" end="200809250300"
    endIndex="49" lineupCount="743" minChannel="1" startIndex="0" />
    <chl afsid="983" stn="983" num="1" name="FiOS 1 TV" sgn=
    "FiOS1">
        <schdl start="20080924150000" tvRtg="TVG" end=
        "20080924153000" fiosId="3478646025" type="Series" rtl=
        "Push Pause" title="Push Pause" />
        <schdl start="20080924153000" tvRtg="TVG" end=
        "20080924160000"
        fiosId="744613566" type="Series" rtl="Push Pause" title=
        "Push Pause" />
        <schdl start="20080924160000" end="20080924173000"
        fiosId="2859550031" type="News" rtl="FiOS 1 Traffic and Weathe"
        title="FiOS 1 Traffic and Weather" />
        <schdl start="20080924173000" tvRtg="TVG" end=
        "20080924180000" fiosId="505802261" type="Series" rtl=
        "Push Pause" title="Push Pause" />
        <schdl start="20080924180000" tvRtg="TVG" end=
        "20080924183000" fiosId="804327809" type="Series" rtl=
        "Push Pause" title="Push Pause" />
        <schdl start="20080924183000" tvRtg="TVG" end=
        "20080924190000" fiosId="1244489497" type="Sports"      rtl=
        "O's Xtra" title="O's Xtra" />
        <schdl start="20080924190000" end="20080924230000"
        fiosId="2864575310" type="Sports"        rtl="MLB Baseball"
        title="MLB Baseball" />
        <schdl start="20080924230000" tvRtg="TVG" end=
        "20080924233000" fiosId="1490532877" type="Sports"      rtl=
        "O's Xtra" title="O's Xtra" />
    </chl>
<result_page>
```

In one implementation, a request for viewing program details may take a form similar to the following example:
http://<ip>:<port>/xml/details?fiosId=2199508525&
regionId=91121&afsid=2&dateTime=20080904180000

In one implementation, an XML for responding to a request to view a program schedule may take a form similar to the following example:

```
<?xml version="1.0" encoding="utf-8" ?>
<result_page>
    <drts>
    <drt>
        <title fld="2">Soul School</title>
        <air chl="189" end="20080924190000" start="20080924180000" />
        <air chl="189" end="20080925030000" start="20080925020000" />
        <air chl="189" end="20080926110000" start="20080926100000" />
    </drt>
    </drts>
</result_page>
```

SCM CONTROLLER

Figure 10:
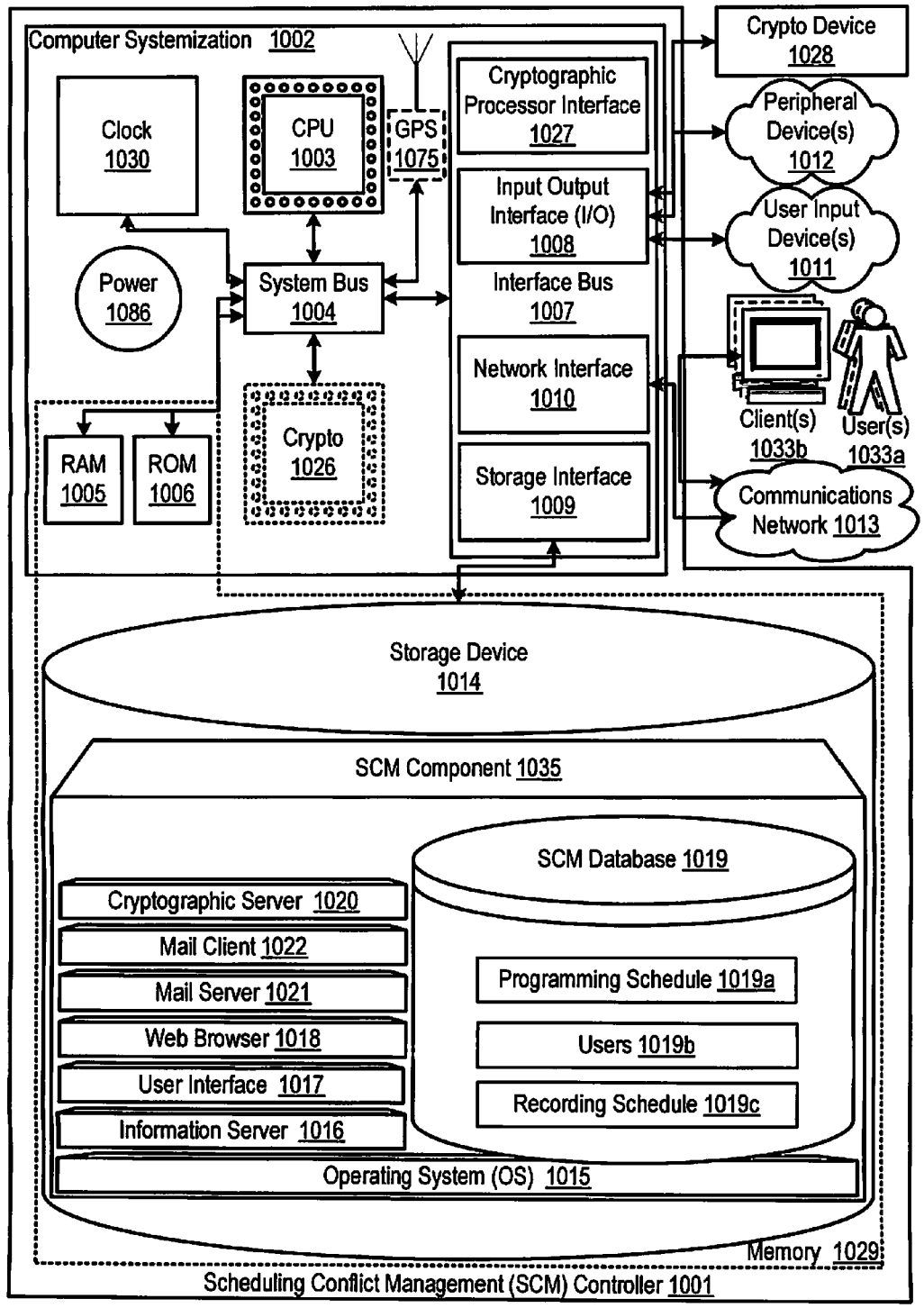
FIG. 10 is of a block diagram illustrating exemplary embodiments of a Manager controller.

FIG. 10 of the present disclosure illustrates inventive aspects of a SCM controller 1001 in a block diagram.

Typically, users, which may be people and/or other systems, engage information technology systems (e.g., commonly computers) to facilitate information processing. In turn, computers employ processors to process information; such processors are often referred to as central processing units (CPUs). A common form of processor is referred to as a microprocessor. CPUs use communicative signals to enable various operations. Such communicative signals may be stored and/or transmitted in batches as program and/or data components facilitate desired operations. These stored instruction code signals may engage the CPU circuit components to perform desired operations. A common type of program is a computer operating system, which, commonly, is executed by CPU on a computer; the operating system enables and facilitates users to access and operate computer information technology and resources. Common resources employed in information technology systems include: input and output mechanisms through which data may pass into and out of a computer; memory storage into which data may be saved; and processors by which information may be processed. Often information technology systems are used to collect data for later retrieval, analysis, and manipulation, commonly. which is facilitated through a database program. Information technology systems provide interfaces that allow users to access and operate various system components.

In one embodiment, the SCM controller 1001 may be connected to and/or communicate with entities such as, but not limited to: one or more users from user input devices 1011; peripheral devices 1012; a cryptographic processor device 1028; and/or a communications network 1013.

Networks are commonly thought to comprise the interconnection and interoperation of clients, servers, and intermediary nodes in a graph topology. It should be noted that the term "server" as used throughout this disclosure refers generally to a computer, other device, program, or combination thereof that processes and responds to the requests of remote users across a communications network. Servers serve their information to requesting "clients." The term "client" as used herein refers generally to a computer, other device, program, or combination thereof that is capable of processing and making requests and obtaining and processing any responses from servers across a communications network. A computer, other device, program, or combination thereof that facilitates, processes information and requests, and/or furthers the passage of information from a source user to a destination user is commonly referred to as a "node." Networks are generally thought to facilitate the transfer of information from source points to destinations. A node specifically tasked with furthering the passage of information from a source to a destination is commonly called a "router." There are many forms of networks such as Local Area Networks (LANs), Pico networks, Wide Area Networks (WANs), Wireless Networks (WLANs), etc. For example, the Internet is generally accepted as being an interconnection of a multitude of networks whereby remote clients and servers may access and interoperate with one another.

The SCM controller 1001 may be based on common computer systems that may comprise, but are not limited to, components such as: a computer systemization 1002 connected to memory 1029.

Computer Systemization

A computer systemization 1002 may comprise a clock 1030, central processing unit (CPU) 1003, a read only memory (ROM) 1006, a random access memory (RAM) 1005, and/or an interface bus 1007, and most frequently, although not necessarily, the foregoing are all interconnected and/or communicating through a system bus 1004. Optionally, the computer systemization may be connected to an internal power source 1086. Optionally, a cryptographic processor 1026 and/or a global positioning system (GPS) component 1075 may be connected to the system bus. The system clock typically has a crystal oscillator and provides a base signal. The clock is typically coupled to the system bus and various clock multipliers that will increase or decrease the base operating frequency for other components interconnected in the computer systemization. The clock and various components in a computer systemization drive signals embodying information throughout the system. Such transmission and reception of signals embodying information throughout a computer systemization may be commonly referred to as communications. These communicative signals may further be transmitted, received, and the cause of return and/or reply signal communications beyond the instant computer systemization to: communications networks, input devices, other computer systemizations, peripheral devices, and/or the like. Of course, any of the above components may be connected directly to one another, connected to the CPU, and/or organized in numerous variations employed as exemplified by various computer systems.

The CPU comprises at least one high-speed data processor adequate to execute program components for executing user and/or system-generated requests. The CPU may be a microprocessor such as AMD's Athlon, Duron and/or Opteron; IBM and/or Motorola's PowerPC; IBM's and Sony's Cell processor; Intel's Celeron, Itanium, Pentium, Xeon, and/or XScale; and/or the like processor(s). The CPU interacts with memory through signal passing through conductive conduits to execute stored signal program code according to conventional data processing techniques. Such signal passing facilitates communication within the SCM controller and beyond through various interfaces. Should processing requirements dictate a greater amount of speed, parallel, mainframe and/or super-computer architectures may similarly be employed. Alternatively, should deployment requirements dictate greater portability, smaller Personal Digital Assistants (PDAs) may be employed.

Power Source

The power source 1086 may be of any standard form for powering small electronic circuit board devices such as the following power cells: alkaline, lithium hydride, lithium ion, lithium polymer, nickel cadmium, solar cells, and/or the like. Other types of AC or DC power sources may be used as well. In the case of solar cells, in one embodiment, the case provides an aperture through which the solar cell may capture photonic energy. The power cell 1086 is connected to at least one of the interconnected subsequent components of the SCM thereby providing an electric current to all subsequent components. In one example, the power source 1086 is connected to the system bus component 1004. In an alternative embodiment, an outside power source 1086 is provided through a connection across the I/O 1008 interface. For example, a USB and/or IEEE 1394 connection carries both data and power across the connection and is therefore a suitable source of power.

Interface Adapters

Interface bus(es) 1007 may accept, connect, and/or communicate to a number of interface adapters, conventionally although not necessarily in the form of adapter cards, such as, but not limited to: input output interfaces (I/O) 1008, storage interfaces 1009, network interfaces 1010, and/or the like. Optionally, cryptographic processor interfaces 1027 similarly may be connected to the interface bus. The interface bus provides for the communications of interface adapters with one another as well as with other components of the computer systemization. Interface adapters are adapted for a compatible interface bus. Interface adapters conventionally connect to the interface bus via a slot architecture. Conventional slot architectures may be employed, such as, but not limited to: Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and/or the like.

Storage interfaces 1009 may accept, communicate, and/or connect to a number of storage devices such as, but not limited to: storage devices 1014, removable disc devices, and/or the like. Storage interfaces may employ connection protocols such as, but not limited to: (Ultra) (Serial) Advanced Technology Attachment (Packet Interface) ((Ultra) (Serial) ATA(PI)), (Enhanced) Integrated Drive Electronics ((E)IDE), Institute of Electrical and Electronics Engineers ((IEEE) 1394, fiber channel, Small Computer Systems Interface (SCSI), Universal Serial Bus (USB), and/or the like.

Network interfaces 1010 may accept, communicate, and/or connect to a communications network 1013. Through a communications network 1013, the SCM controller is accessible through remote clients 1033b (e.g., computers with web browsers) by users 1033a. Network interfaces may employ connection protocols such as, but not limited to: direct connect, Ethernet (thick, thin, twisted pair 10/100/1000 Base T, and/or the like), Token Ring, wireless connection such as IEEE 802.11a-x, and/or the like. A communications network may be any one and/or the combination of the following: a direct interconnection; the Internet; a Local Area Network (LAN); a Metropolitan Area Network (MAN); an Operating Missions as Nodes on the Internet (OMNI); a secured custom connection; a Wide Area Network (WAN); a wireless network (e.g., employing protocols such as, but not limited to a Wireless Application Protocol (WAP), I-mode, and/or the like); and/or the like. A network interface may be regarded as a specialized form of an input output interface. Further, multiple network interfaces 1010 may be used to engage with various communications network types 1013. For example, multiple network interfaces may be employed to allow for the communication over broadcast, multicast, and/or unicast networks.

Input Output interfaces (I/O) 1008 may accept, communicate, and/or connect to user input devices 1011, peripheral devices 1012, cryptographic processor devices 1028, and/or the like. I/O may employ connection protocols such as, but not limited to: Apple Desktop Bus (ADB); Apple Desktop Connector (ADC); audio: analog, digital, monaural, RCA, stereo, and/or the like; IEEE 1394a-b; infrared; joystick; keyboard: midi; optical; PC AT; PS/2; parallel; radio; serial; USB; video interface: BNC, coaxial, composite, digital, Digital Visual Interface (DVI), RCA, RF antennae, S-Video, VGA, and/or the like; wireless; and/or the like. A common output device is a television set, which accepts signals from a video interface. Also, a video display, which typically comprises a Cathode Ray Tube (CRT) or Liquid Crystal Display (LCD) based monitor with an interface (e.g., DVI circuitry and cable) that accepts signals from a video interface, may be used. The video interface composites information generated by a computer systemization and generates video signals based on the composited information in a video memory frame. Typically, the video interface provides the composited video information through a video connection interface that accepts a video display interface (e.g., an RCA composite video connector accepting an RCA composite video cable; a DVI connector accepting a DVI display cable, etc.).

User input devices 1011 may be card readers, dongles, finger print readers, gloves, graphics tablets, joysticks, keyboards, mouse (mice), remote controls, retina readers, trackballs, trackpads, and/or the like.

Peripheral devices 1012 may be connected and/or communicate to I/O and/or other facilities of the like such as network interfaces, storage interfaces, and/or the like. Peripheral devices may be audio devices, cameras, dongles (e.g., for copy protection, ensuring secure transactions with a digital signature, and/or the like), external processors (for added functionality), goggles, microphones, monitors, network interfaces, printers, scanners, storage devices, video devices, video sources, visors, and/or the like.

It should be noted that although user input devices and peripheral devices may be employed, the SCM controller may be embodied as an embedded, dedicated, and/or monitor-less (i.e., headless) device, wherein access would be provided over a network interface connection.

Cryptographic units such as, but not limited to, microcontrollers, processors 1026, interfaces 1027, and/or devices 1028 may be attached, and/or communicate with the SCM controller. A MC68HC16 microcontroller, commonly manufactured by Motorola Inc., may be used for and/or within cryptographic units. Equivalent microcontrollers and/or processors may also be used. The MC68HC16 microcontroller utilizes a 16-bit multiply-and-accumulate instruction in the 16 MHz configuration and requires less than one second to perform a 512-bit RSA private key operation. Cryptographic units support the authentication of communications from interacting agents, as well as allow for anonymous transactions. Cryptographic units may also be configured as part of CPU. Other commercially available specialized cryptographic processors include VLSI Technology's 33 MHz 6868 or Semaphore Communications' 40 MHz Roadrunner 184.

Memory

Generally, any mechanization and/or embodiment allowing a processor to affect the storage and/or retrieval of information is regarded as memory 1029. However, memory is a fungible technology and resource; thus, any number of memory embodiments may be employed in lieu of or in concert with one another. It is to be understood that the SCM controller and/or a computer systemization may employ various forms of memory 1029. For example, a computer systemization may be configured wherein the functionality of on-chip CPU memory (e.g., registers), RAM, ROM, and any other storage devices are provided by a paper punch tape or paper punch card mechanism; of course, such an embodiment would result in an extremely slow rate of operation. In a typical configuration, memory 1029 will include ROM 1006, RAM 1005, and a storage device 1014. A storage device 1014 may be any conventional computer system storage. Storage devices may include a drum; a (fixed and/or removable) magnetic disk drive; a magneto-optical drive; an optical drive (i.e., CD ROM/RAM/Recordable (R), ReWritable (RW), DVD R/RW, etc.); an array of devices (e.g., Redundant Array of Independent Disks (RAID)); and/or other devices of the like. Thus, a computer systemization generally requires and makes use of memory.

Component Collection

The memory 1029 may contain a collection of program and/or database components and/or data such as, but not limited to: operating system component(s) 1015 (operating system); information server component(s) 1016 (information server); user interface component(s) 1017 (user interface); Web browser component(s) 1018 (Web browser); database(s) 1019; mail server component(s) 1021; mail client component(s) 1022; cryptographic server component(s) 1020 (cryptographic server); the SCM component(s) 1035; and/or the like (i.e., collectively a component collection). These components may be stored and accessed from the storage devices and/or from storage devices accessible through an interface bus. Although non-conventional program components such as those in the component collection, typically, are stored in a local storage device 1014, they may also be loaded and/or stored in memory such as: peripheral devices, RAM, remote storage facilities through a communications network, ROM, various forms of memory, and/or the like.

Operating System

The operating system component 1015 is an executable program component facilitating the operation of the SCM controller. Typically, the operating system facilitates access of I/O, network interfaces, peripheral devices, storage devices, and/or the like. The operating system may be a highly fault tolerant, scalable, and secure system such as: Apple Macintosh OS X (Server); AT&T Plan 9; Be OS; Unix and Unix and Unix-like system distributions (such as AT&T's UNIX; Berkley Software Distribution (BSD) variations such as FreeBSD, NetBSD, OpenBSD, and/or the like; Linux distributions such as Red Hat, Ubuntu, and/or the like); and/or the like operating systems. However, more limited and/or less secure operating systems also may be employed such as Apple Macintosh OS, IBM OS/2, Microsoft DOS, Microsoft Windows 2000/2003/3.1/95/98/CE/Millenium/NT/Vista/XP (Server), Palm OS, and/or the like. An operating system may communicate to and/or with other components in a component collection, including itself, and/or the like. Most frequently, the operating system communicates with other program components, user interfaces, and/or the like. For example, the operating system may contain, communicate, generate, obtain, and/or provide program component, system, user, and/or data communications, requests, and/or responses. The operating system, once executed by the CPU, may enable the interaction with communications networks, data, I/O, peripheral devices, program components, memory, user input devices, and/or the like. The operating system may provide communications protocols that allow the SCM controller to communicate with other entities through a communications network 1013. Various communication protocols may be used by the SCM controller as a subcarrier transport mechanism for interaction, such as, but not limited to: multicast, TCP/IP, UDP, unicast, and/or the like.

Information Server

An information server component 1016 is a stored program component that is executed by a CPU. The information server may be a conventional Internet information server such as, but not limited to Apache Software Foundation's Apache, Microsoft's Internet Information Server, and/or the like. The information server may allow for the execution of program components through facilities such as Active Server Page (ASP), ActiveX, (ANSI) (Objective-) C (++), C# and/or .NET, Common Gateway Interface (CGI) scripts, Java, JavaScript, Practical Extraction Report Language (PERL), Hypertext Pre-Processor (PHP), pipes, Python, WebObjects, and/or the like. The information server may support secure communications protocols such as, but not limited to, File Transfer Protocol (FTP); HyperText Transfer Protocol (HTTP); Secure Hypertext Transfer Protocol (HTTPS), Secure Socket Layer (SSL), messaging protocols (e.g., America Online (AOL) Instant Messenger (AIM), Application Exchange (APEX), ICQ, Internet Relay Chat (IRC), Microsoft Network (MSN) Messenger Service, Presence and Instant Messaging Protocol (PRIM), Internet Engineering Task Force's (IETF's) Session Initiation Protocol (SIP), SIP for Instant Messaging and Presence Leveraging Extensions (SIMPLE), open XML-based Extensible Messaging and Presence Protocol (XMPP) (i.e., Jabber or Open Mobile Alliance's (OMA's) Instant Messaging and Presence Service (IMPS)), Yahoo! Instant Messenger Service, and/or the like. The information server provides results in the form of Web pages to Web browsers, and allows for the manipulated generation of the Web pages through interaction with other program components. After a Domain Name System (DNS) resolution portion of an HTTP request is resolved to a particular information server, the information server resolves requests for information at specified locations on the SCM controller based on the remainder of the HTTP request. For example, a request such as http://123.124.125.126/myInformation.html might have the IP portion of the request "123.124.125.126" resolved by a DNS server to an information server at that IP address; that information server might in turn further parse the http request for the "/myInformation.html" portion of the request and resolve it to a location in memory containing the information "myInformation.html." Additionally, other information serving protocols may be employed across various ports, e.g., FTP communications across port 21, and/or the like. An information server may communicate to and/or with other components in a component collection, including itself, and/or facilities of the like. Most frequently, the information server communicates with the SCM database 1019, operating systems, other program components, user interfaces, Web browsers, and/or the like.

Access to the SCM database may be achieved through a number of database bridge mechanisms such as through scripting languages as enumerated below (e.g., CCI) and through inter-application communication channels as enumerated below (e.g., CORBA, WebObjects, etc.). Any data requests through a Web browser are parsed through the bridge mechanism into appropriate grammars as required by the SCM. In one embodiment, the information server would provide a Web form accessible by a Web browser. Entries made into supplied fields in the Web form are tagged as having been entered into the particular fields, and parsed as such. The entered terms are then passed along with the field tags, which act to instruct the parser to generate queries directed to appropriate tables and/or fields. In one embodiment, the parser may generate queries in standard SQL by instantiating a search string with the proper join/select commands based on the tagged text entries, wherein the resulting command is provided over the bridge mechanism to the SCM as a query. Upon generating query results from the query, the results are passed over the bridge mechanism, and may be parsed for formatting and generation of a new results Web page by the bridge mechanism. Such a new results Web page is then provided to the information server, which may supply it to the requesting Web browser.

Also, an information server may contain, communicate, generate, obtain, and/or provide program component, system, user, and/or data communications, requests, and/or responses.

User Interface

The function of computer interfaces in some respects is similar to automobile operation interfaces. Automobile operation interface elements such as steering wheels, gearshifts, and speedometers facilitate the access, operation, and display of automobile resources, functionality, and status. Computer interaction interface elements such as check boxes, cursors, menus, scrollers, and windows (collectively and commonly referred to as widgets) similarly facilitate the access, operation, and display of data and computer hardware and operating system resources, functionality, and status. Operation interfaces are commonly called user interfaces. Graphical user interfaces (GUIs) such as the Apple Macintosh Operating System's Aqua, IBM's OS/2, Microsoft's Windows 2000/2003/3.1/95/98/CE/Millenium/NT/Vista (i.e., Aero)/XP, or Unix's X-Windows (e.g., which may include additional Unix graphic interface libraries and layers such as K Desktop Environment (KDE), mythTV and GNU Network Object Model Environment (GNOME)), provide a baseline and means of accessing and displaying information graphically to users.

A user interface component 1017 is a stored program component that is executed by a CPU. The user interface may be a conventional graphic user interface as provided by, with, and/or atop operating systems and/or operating environments such as already discussed. The user interface may allow for the display, execution, interaction, manipulation, and/or operation of program components and/or system facilities through textual and/or graphical facilities. The user interface provides a facility through which users may affect, interact with, and/or operate a computer system. A user interface may communicate to and/or with other components in a component collection, including itself, and/or facilities of the like. Most frequently, the user interface communicates with operating systems, other program components, and/or the like. The user interface may contain, communicate, generate, obtain, and/or provide program component, system, user, and/or data communications, requests, and/or responses.

Web Browser

A Web browser component 1018 is a stored program component that is executed by a CPU. The Web browser may be a conventional hypertext viewing application such as Microsoft Internet Explorer or Netscape Navigator. Secure Web browsing may be supplied with 128 bit (or greater) encryption by way of HTTPS, SSL, and/or the like. Some Web browsers allow for the execution of program components through facilities such as Java, JavaScript, ActiveX, web browser plug-in APIs (e.g., FireFox, Safari Plug-in, and/or the like APIs), and/or the like. Web browsers and like information access tools may be integrated into PDAs, cellular telephones, and/or other mobile devices. A Web browser may communicate to and/or with other components in a component collection, including itself, and/or facilities of the like. Most frequently, the Web browser communicates with information servers, operating systems, integrated program components (e.g., plug-ins), and/or the like; e.g., it may contain, communicate, generate, obtain, and/or provide program component, system, user, and/or data communications, requests, and/or responses. Of course, in place of a Web browser and information server, a combined application may be developed to perform similar functions of both. The combined application would similarly affect the obtaining and the provision of information to users, user agents, and/or the like from the SCM enabled nodes. The combined application may be nugatory on systems employing standard Web browsers.

Mail Server

A mail server component 1021 is a stored program component that is executed by a CPU 1003. The mail server may be a conventional Internet mail server such as, but not limited to sendmail, Microsoft Exchange, and/or the like. The mail server may allow for the execution of program components through facilities such as ASP, ActiveX, (ANSI) (Objective-) C (++), C# and/or .NET, CGI scripts, Java, JavaScript, PERL, PHP, pipes, Python, WebObjects, and/or the like. The mail server may support communications protocols such as, but not limited to: Internet message access protocol (IMAP), Messaging Application Programming Interface (MAPI)/Microsoft Exchange, post office protocol (POP3), simple mail transfer protocol (SMTP), and/or the like. The mail server can route, forward, and process incoming and outgoing mail messages that have been sent, relayed and/or otherwise traversing through and/or to the SCM.

Access to the SCM mail may be achieved through a number of APIs offered by the individual Web server components and/or the operating system.

Also, a mail server may contain, communicate, generate, obtain, and/or provide program component, system, user, and/or data communications, requests, information, and/or responses.

Mail Client

A mail client component 1022 is a stored program component that is executed by a CPU 1003. The mail client may be a conventional mail viewing application such as Apple Mail, Microsoft Entourage, Microsoft Outlook, Microsoft Outlook Express, Mozilla, Thunderbird, and/or the like. Mail clients may support a number of transfer protocols, such as: IMAP, Microsoft Exchange, POP3, SMTP, and/or the like. A mail client may communicate to and/or with other components in a component collection, including itself, and/or facilities of the like. Most frequently, the mail client communicates with mail servers, operating systems, other mail clients, and/or the like; e.g., it may contain, communicate, generate, obtain, and/or provide program component, system, user, and/or data communications, requests, information, and/or responses. Generally, the mail client provides a facility to compose and transmit electronic mail messages.

Cryptographic Server

A cryptographic server component 1020 is a stored program component that is executed by a CPU 1003, cryptographic processor 1026, cryptographic processor interface 1027, cryptographic processor device 1028, and/or the like. Cryptographic processor interfaces will allow for expedition of encryption and/or decryption requests by the cryptographic component; however, the cryptographic component, alternatively, may run on a conventional CPU. The cryptographic component allows for the encryption and/or decryption of provided data. The cryptographic component allows for both symmetric and asymmetric (e.g., Pretty Good Protection (PGP)) encryption and/or decryption. The cryptographic component may employ cryptographic techniques such as, but not limited to: digital certificates (e.g., X.509 authentication framework), digital signatures, dual signatures, enveloping, password access protection, public key management, and/or the like. The cryptographic component will facilitate numerous (encryption and/or decryption) security protocols such as, but not limited to: checksum, Data Encryption Standard (DES), Elliptical Curve Encryption (ECC), International Data Encryption Algorithm (IDEA), Message Digest 5 (MD5, which is a one way hash function), passwords, Rivest Cipher (RC5), Rijndael, RSA (which is an Internet encryption and authentication system that uses an algorithm developed in 1977 by Ron Rivest, Adi Shamir, and Leonard Adleman), Secure Hash Algorithm (SHA), Secure Socket Layer (SSL), Secure Hypertext Transfer Protocol (HTTPS), and/or the like. Employing such encryption security protocols, the SCM may encrypt all incoming and/or outgoing communications and may serve as node within a virtual private network (VPN) with a wider communications network. The cryptographic component facilitates the process of "security authorization" whereby access to a resource is inhibited by a security protocol wherein the cryptographic component effects authorized access to the secured resource. In addition, the cryptographic component may provide unique identifiers of content, e.g., employing and MD5 hash to obtain a unique signature for an digital audio file. A cryptographic component may communicate to and/or with other components in a component collection, including itself, and/or facilities of the like. The cryptographic component supports encryption schemes allowing for the secure transmission of information across a communications network to enable the SCM component to engage in secure transactions if so desired. The cryptographic component facilitates the secure accessing of resources on the SCM and facilitates the access of secured resources on remote systems; i.e., it may act as a client and/or server of secured resources. Most frequently, the cryptographic component communicates with information servers, operating systems, other program components, and/or the like. The cryptographic component may contain, communicate, generate, obtain, and/or provide program component, system, user, and/or data communications, requests, and/or responses.

The SCM Database

The SCM database component 1019 may be embodied in a database and its stored data. The database is a stored program component, which is executed by the CPU; the stored program component portion configuring the CPU to process the stored data. The database may be a conventional, fault tolerant, relational, scalable, secure database such as Oracle or Sybase. Relational databases are an extension of a flat file. Relational databases consist of a series of related tables. The tables are interconnected via a key field. Use of the key field allows the combination of the tables by indexing against the key field; i.e., the key fields act as dimensional pivot points for combining information from various tables. Relationships generally identify links maintained between tables by matching primary keys. Primary keys represent fields that uniquely identify the rows of a table in a relational database. More precisely, they uniquely identify rows of a table on the "one" side of a one-to-many relationship.

Alternatively, the SCM database may be implemented using various standard data-structures, such as an array, hash, (linked) list, struct, structured text file (e.g., XML), table, and/or the like. Such data-structures may be stored in memory and/or in (structured) files. In another alternative, an object-oriented database may be used, such as Frontier, ObjectStore, Poet, Zope, and/or the like. Object databases can include a number of object collections that are grouped and/or linked together by common attributes; they may be related to other object collections by some common attributes. Object-oriented databases perform similarly to relational databases with the exception that objects are not just pieces of data, but may have other types of functionality encapsulated within a given object. If the SCM database is implemented as a data-structure, the use of the SCM database 1019 may be integrated into another component such as the SCM component 1035. Also, the database may be implemented as a mix of data structures, objects, and relational structures. Databases may be consolidated and/or distributed in countless variations through standard data processing techniques. Portions of databases, e.g., tables, may be exported and/or imported and thus decentralized and/or integrated.

In one embodiment, the database component 1019 includes several tables 1019a-c. A Programming Schedule table 1019b may include fields such as, but not limited to: schedule_ID, program_ID(s), program_name(s), program_type(s), play_time(s), channel(s), playback_requirements, parental_warning(s), and/or the like. A Users table 1019b may include fields such as, but not limited to: user_ID, user_name, contact_info, hardware_ID(s), local_media_receiver_ID, local_media_receiver_type, display_ID, display_type, mobile_device_ID, mobile_device_type, service_account, recording_schedule_ID, usage history, access and/or authorizations, and/or the like. A Recording Schedule table 1019c may include fields such as, but not limited to: recording_schedule_ID, program_ID(s), play_time(s), program_p-riorities, user_ID(s), and/or the like. These tables may support and/or track multiple entity accounts on the SCM controller.

In one embodiment, the SCM database may interact with other database systems. For example, employing a distributed database system, queries and data access by search SCM component may treat the combination of the SCM database, an integrated data security layer database as a single database entity.

In one embodiment, user programs may contain various user interface primitives, which may serve to update the SCM. Also, various accounts may require custom database tables depending upon the environments and the types of clients the SCM may need to serve. It should be noted that any unique fields may be designated as a key field throughout. In an alternative embodiment, these tables have been decentralized into their own databases and their respective database controllers (i.e., individual database controllers for each of the above tables). Employing standard data processing techniques, one may further distribute the databases over several computer systemizations and/or storage devices. Similarly, configurations of the decentralized database controllers may be varied by consolidating and/or distributing the various database components 1019a-c. The SCM may be configured to keep track of various settings, inputs, and parameters via database controllers.

The SCM database may communicate to and/or with other components in a component collection, including itself, and/or facilities of the like. Most frequently, the SCM database communicates with the SCM component, other program components, and/or the like. The database may contain, retain, and provide information regarding other nodes and data.

The SCM Component

The SCM component 1035 is a stored program component that is executed by a CPU. In one embodiment, the SCM component incorporates any and/or all combinations of the aspects of the SCM that was discussed in the previous figures, As such, the SCM affects accessing., obtaining and the provision of information, services, transactions, and/or the like across various communications networks.

The SCM component is configurable to access, calculate, engage, exchange, generate, identify, instruct, match, process, search, serve, store, and/or facilitate scheduled recordings, remote scheduling, schedule conflict management, and/or the like and use of the SCM.

The SCM component enabling access of information between nodes may be developed by employing standard development tools and languages such as, but not limited to: Apache components, Assembly, ActiveX, binary executables, (ANSI) (Objective-) C (++), C# and/or .NET, database adapters, CGI scripts, Java, JavaScript, mapping tools, procedural and object oriented development tools, PERL, PHP, Python, shell scripts, SQL commands, web application server extensions, WebObjects, and/or the like. In one embodiment, the SCM server employs a cryptographic server to encrypt and decrypt communications. The SCM component may communicate to and/or with other components in a component collection, including itself, and/or facilities of the like. Most frequently, the SCM component communicates with the SCM database, operating systems, other program components, and/or the like. The SCM may contain, communicate, generate, obtain, and/or provide program component, system, user, and/or data communications, requests, and/or responses.

Distributed SCMs

The structure and/or operation of any of the SCM node controller components may be combined, consolidated, and/or distributed in any number of ways to facilitate development and/or deployment. Similarly, the component collection may be combined in any number of ways to facilitate deployment and/or development. To accomplish this, one may integrate the components into a common code base or in a facility that can dynamically load the components on demand in an integrated fashion.

The component collection may be consolidated and/or distributed in countless variations through standard data processing and/or development techniques. Multiple instances of any one of the program components in the program component collection may be instantiated on a single node, and/or across numerous nodes to improve performance through load-balancing and/or data-processing techniques. Furthermore, single instances may also be distributed across multiple controllers and/or storage devices; e.g., databases. All program component instances and controllers working in concert may do so through standard data processing communication techniques.

The configuration of the SCM controller will depend on the context of system deployment. Factors such as, but not limited to, the budget, capacity, location, and/or use of the underlying hardware resources may affect deployment requirements and configuration. Regardless of if the configuration results in more consolidated and/or integrated program components, results in a more distributed series of program components, and/or results in some combination between a consolidated and distributed configuration, data may be communicated, obtained, and/or provided. Instances of components consolidated into a common code base from the program component collection may communicate, obtain, and/or provide data. This may be accomplished through intra-application data processing communication techniques such as, but not limited to: data referencing (e.g., pointers), internal messaging, object instance variable communication, shared memory space, variable passing, and/or the like.

If component collection components are discrete, separate, and/or external to one another, then communicating, obtaining, and/or providing data with and/or to other component components may be accomplished through inter-application data processing communication techniques such as, but not limited to: Application Program Interfaces (API) information passage; (distributed) Component Object Model ((D)COM). (Distributed) Object Linking and Embedding ((D)OLE), and/or the like), Common Object Request Broker Architecture (CORBA), local and remote application program interfaces Jini, Remote Method Invocation (RMI), process pipes, shared files, and/or the like. Messages sent between discrete component components for inter-application communication or within memory spaces of a singular component for intra-application communication may be facilitated through the creation and parsing of a grammar. A grammar may be developed by using standard development tools such as lex, yacc, XML, and/or the like, which allow for grammar generation and parsing functionality, which in turn may form the basis of communication messages within and between components. Again, the configuration will depend upon the context of system deployment.

The entirety of this disclosure (including the Cover Page, Title, Headings, Field, Background, Summary, Brief Description of the Drawings, Detailed Description, Claims, Abstract, Figures, and otherwise) shows by way of illustration various embodiments in which the claimed inventions may be practiced. The advantages and features of the disclosure are of a representative sample of embodiments only, and are not exhaustive and/or exclusive. They are presented only to assist in understanding and teach the claimed principles. It should be understood that they are not representative of all claimed inventions. As such, certain aspects of the disclosure have not been discussed herein. That alternate embodiments may not have been presented for a specific portion of the invention or that further undescribed alternate embodiments may be available for a portion is not to be considered a disclaimer of those alternate embodiments. It will be appreciated that many of those undescribed embodiments incorporate the same principles of the invention and others are equivalent. Thus, it is to be understood that other embodiments may be utilized and functional, logical, organizational, structural and/or topological modifications may be made without departing from the scope and/or spirit of the disclosure. As such, all examples and/or embodiments are deemed to be non-limiting throughout this disclosure. Also, no inference should be drawn regarding those embodiments discussed herein relative to those not discussed herein other than it is as such for purposes of reducing space and repetition. For instance, it is to be understood that the logical and/or topological structure of any combination of any program components (a component collection), other components and/or any present feature sets as described in the figures and/or throughout are not limited to a fixed operating order and/or arrangement, but rather, any disclosed order is exemplary and all equivalents, regardless of order, are contemplated by the disclosure. Furthermore, it is to be understood that such features are not limited to serial execution, but rather, any number of threads, processes, services, servers, and/or the like that may execute asynchronously, concurrently, in parallel, simultaneously, synchronously, and/or the like are contemplated by the disclosure. As such, some of these features may be mutually contradictory, in that they cannot be simultaneously present in a single embodiment. Similarly, some features are applicable to one aspect of the invention, and inapplicable to others. In addition, the disclosure includes other inventions not presently claimed. Applicant reserves all rights in those presently unclaimed inventions including the right to claim such inventions, file additional applications, continuations, continuations in part, divisions, and/or the like thereof. As such, it should be understood that advantages, embodiments, examples, functional, features, logical, organizational, structural, topological, and/or other aspects of the disclosure are not to be considered limitations on the disclosure as defined by the claims or limitations on equivalents to the claims.

What is claimed is:

1. A method, comprising:
   receiving a new scheduled recording instruction comprising at least a program identifier and a time;
   comparing the new scheduled recording instruction to an existing recording schedule to determine if a recording conflict exists;
   rescheduling, when the recording conflict is determined to exist, programs corresponding to the existing recording schedule, the rescheduling including:
      determining priority values associated with the program corresponding to the new scheduled recording instruction and the programs corresponding to the existing recording schedule, and
      recursively applying a conflict resolution procedure, based on the determined priority values, to the program corresponding to the new scheduled recording instruction and the programs corresponding to the existing recording schedule, to yield a new recording schedule of all programs scheduled to be recorded, the recursive application of the conflict resolution procedure including repeatedly applying the conflict resolution procedure for each of the programs corresponding to the new scheduled recording instruction and the existing recording schedule;
   querying a program profile associated with the program to determine whether the program corresponding to the new scheduled recording instruction is broadcast in high definition; and
   storing the new recording schedule in a scheduling database, wherein
   when the program is broadcast in high definition, determining if a high definition tuner is available, and, when a high definition tuner is available, performing the comparing the new scheduled recording instruction, the rescheduling, and the storing of the new recording schedule in association with the high definition tuner.

2. The method of claim 1, wherein the conflict resolution procedure further comprises:
   searching a programming schedule for at least one alternative time for the program, wherein the at least one alternative time is different than the time corresponding to the new scheduled recording instruction;
   when the at least one alternative time exists, appending a second scheduled recording instruction, specifying that the program is to be recorded at the at least one alternative time.

3. The method of claim 1, wherein applying the conflict resolution procedure comprises:
   searching a programming schedule for at least one alternative time for the program in the existing recording schedule, wherein the at least one alternative time is different than the time corresponding to the new scheduled recording instruction;
   when the at least one alternative time exists, generating a second scheduled recording instruction, specifying that the program is to be recorded at the time corresponding to the new scheduled recording instruction and at least one program in the existing recording schedule is to be recorded at the at least one alternative time.

4. The method of claim 1, wherein the conflict resolution procedure comprises a weighted multi-stage conflict resolution procedure.

5. The method of claim 4, wherein the weighted multi-stage conflict resolution further comprises:
   recursively applying the multi-stage conflict resolution procedure for the program in light of all other programs having lower priority.

6. The method of claim 5, further comprising:
   receiving, from a user, priority values for the program and for the programs corresponding to the existing recording schedule.

7. The method of claim 6, wherein the priority values are received via a web interface.

8. The method of claim 6, wherein the priority values are received via a mobile device.

9. The method of claim 1, wherein the program corresponds to a radio program.

10. The method of claim 1, wherein the program corresponds to a television program.

11. The method of claim 1, wherein the program corresponds to an Internet event.

12. The method of claim 1 wherein the new scheduled recording instruction is received from a remote device.

13. The method of claim 12, wherein the remote device comprises a mobile telephone.

14. The method of claim 1, wherein the new recording schedule is provided to a digital video recording system for scheduled recording of digital video content.

15. A system, comprising:
   a processor;
   a memory in communication with the processor and containing program instructions;

an input and output in communication with the processor and memory;

wherein the processor executes program instructions contained in the memory and the program instructions comprise instructions that cause the processor to:

receive a new scheduled recording instruction comprising at least a program identifier and a time;

compare the new scheduled recording instruction to an existing recording schedule to determine if a recording conflict exists;

reschedule, when the recording conflict is determined to exist, programs corresponding to the existing recording schedule, the rescheduling including:

determining priority values associated with the program corresponding to the new scheduled recording instruction and the programs corresponding to the existing recording schedule, and recursively apply a conflict resolution procedure, based on the determined priority values, to the program corresponding to the new scheduled recording instruction and the programs corresponding to the existing recording schedule, to yield a new recording schedule of all programs scheduled to be recorded, the recursive application of the conflict resolution procedure including repeatedly applying the conflict resolution procedure for each of the programs corresponding to the new scheduled recording instruction and the existing recording schedule;

querying a program profile associated with the program to determine whether the program corresponding to the new scheduled recording instruction is broadcast in high definition; and store the new recording schedule in a scheduling database, wherein when the program is broadcast in high definition, determining if a high definition tuner is available, and, when a high definition tuner is available, performing the comparing the new scheduled recording instruction, the rescheduling, and the storing of the new recording schedule in association with the high definition tuner.

16. The system of claim 15, wherein the conflict resolution procedure further comprises:

searching a programming schedule for at least one alternative time for the program, wherein the at least one alternative time is different than the time corresponding to the new scheduled recording instruction;

when the at least one alternative time exists, appending a second scheduled recording instruction, specifying that the program is to be recorded at the at least one alternative time.

17. The system of claim 15, wherein the program corresponds to a television program.

18. A non-transitory computer program product, comprising:

processor readable instructions stored in the computer program product, wherein the processor readable instructions are issuable by a processor to:

receive a new scheduled recording instruction comprising at least a program identifier and a time;

compare the new scheduled recording instruction to an existing recording schedule to determine if a recording conflict exists;

reschedule, when the recording conflict is determined to exist, programs corresponding to the existing recording schedule, the rescheduling including:

determining priority values associated with the program corresponding to the new scheduled recording instruction and the programs corresponding to the existing recording schedule, and recursively applying a conflict resolution procedure, based on the determined priority values, to the program corresponding to the new scheduled recording instruction and the programs corresponding to the existing recording schedule, to yield a new recording schedule of all programs scheduled to be recorded, the recursive application of the conflict resolution procedure including repeatedly applying the conflict resolution procedure for each of the programs corresponding to the new scheduled recording instruction and the existing recording schedule; and querying a program profile associated with the program to determine whether the program corresponding to the new scheduled recording instruction is broadcast in high definition; and storing the new recording schedule in a scheduling database, wherein when the program is broadcast in high definition, determining if a high definition tuner is available, and, when a high definition tuner is available, performing the comparing the new scheduled recording instruction, the rescheduling, and the storing of the new recording schedule in association with the high definition tuner.

19. The non-transitory computer program product of claim 18, wherein the conflict resolution procedure further comprises:

searching a programming schedule for at least one alternative time for the program, wherein the at least one alternative time is different than the time corresponding to the new scheduled recording instruction;

when the at least one alternative time exists, appending a second scheduled recording instruction, specifying that the program is to be recorded at the at least one alternative time.

* * * * *